United States Patent
Liddicott et al.

(10) Patent No.: US 10,476,980 B2
(45) Date of Patent: Nov. 12, 2019

(54) REMOTE SOCKET SPLICING SYSTEM

(71) Applicant: Dell Products L.P., Round Rock, TX (US)

(72) Inventors: Samuel Liddicott, Wakefield (GB); Shane O'Hanlon, Annascaul (IE)

(73) Assignee: Dell Products L.P., Round Rock, TX (US)

( * ) Notice: Subject to any disclaimer, the term of this patent is extended or adjusted under 35 U.S.C. 154(b) by 771 days.

(21) Appl. No.: 14/821,382

(22) Filed: Aug. 7, 2015

(65) Prior Publication Data
US 2017/0041418 A1 Feb. 9, 2017

(51) Int. Cl.
*H04L 29/08* (2006.01)
*H04L 12/707* (2013.01)
*H04L 12/775* (2013.01)

(52) U.S. Cl.
CPC .......... *H04L 67/2814* (2013.01); *H04L 45/22* (2013.01); *H04L 45/58* (2013.01); *H04L 67/141* (2013.01); *H04L 67/28* (2013.01)

(58) Field of Classification Search
CPC ....... H04L 47/193; H04L 67/28; H04L 45/22; H04L 45/58
See application file for complete search history.

(56) References Cited

U.S. PATENT DOCUMENTS

| | | | |
|---|---|---|---|
| 7,197,573 B1 * | 3/2007 | Jacobson | H04L 43/0882 370/237 |
| 7,325,070 B1 * | 1/2008 | Mallena | H04L 69/16 709/227 |
| 9,009,353 B1 * | 4/2015 | Donley | H04L 69/167 709/246 |
| 9,319,476 B2 * | 4/2016 | Joachimpillai | H04L 67/28 |
| 2001/0048683 A1 * | 12/2001 | Allan | H04Q 11/0478 370/395.21 |
| 2006/0212587 A1 * | 9/2006 | Barsuk | H04L 67/14 709/228 |
| 2007/0055788 A1 * | 3/2007 | Dunshea | H04L 69/16 709/232 |

(Continued)

OTHER PUBLICATIONS

Marcel-Catalin Rosu and Daniela Rosa, "An Evaluation of TCP Splice Benefits in Web Proxy Servers," May 7-11 2002, pp. 1-23, Honolulu, Hawaii, http//www2002.org/CDROM/refereed/627/.

(Continued)

*Primary Examiner* — Kevin T Bates
*Assistant Examiner* — Mark A Scott
(74) *Attorney, Agent, or Firm* — Haynes and Boone, LLP

(57) ABSTRACT

A remote socket splicing system includes a first computing device and a second computing device that are coupled to a router device. A proxy system is coupled to the router device. The proxy system is configured to operate on a first connection with the first computing device through the first router device, and operate on a second connection with the second computing device through the first router device. The proxy system is also configured to send an instruction to perform a socket splicing operation to the first router device subsequent to operating on the first connection and the second connection. The first router device is configured to perform the socket splicing operation to provide a data path between the first computing device and the second computing device that does not include the proxy system.

20 Claims, 11 Drawing Sheets

(56) References Cited

U.S. PATENT DOCUMENTS

| | | | | |
|---|---|---|---|---|
| 2007/0124489 A1* | 5/2007 | Swander | H04L 29/12481 | 709/230 |
| 2007/0189201 A1* | 8/2007 | Feder | H04W 36/22 | 370/328 |
| 2008/0109554 A1* | 5/2008 | Jing | H04L 12/14 | 709/230 |
| 2008/0183853 A1* | 7/2008 | Manion | H04L 12/4641 | 709/223 |
| 2008/0235382 A1* | 9/2008 | Marwah | H04L 69/16 | 709/228 |
| 2009/0094317 A1* | 4/2009 | Venkitaraman | H04L 29/12311 | 709/203 |
| 2009/0141631 A1* | 6/2009 | Kim | H04L 43/08 | 370/235 |
| 2009/0193443 A1* | 7/2009 | Lakshmanan | G06F 9/544 | 719/330 |
| 2010/0128696 A1* | 5/2010 | Fantini | H04L 29/12028 | 370/331 |
| 2010/0174817 A1* | 7/2010 | Chetuparambil | H04L 69/16 | 709/227 |
| 2011/0126134 A1* | 5/2011 | Macken | H04L 67/02 | 715/760 |
| 2011/0277022 A1* | 11/2011 | Weizman | H04L 29/12528 | 726/7 |
| 2011/0289230 A1* | 11/2011 | Ueno | H04L 45/42 | 709/228 |
| 2012/0163167 A1* | 6/2012 | Dade | H04L 47/40 | 370/229 |
| 2012/0182995 A1* | 7/2012 | Li | H04W 40/36 | 370/392 |
| 2012/0269059 A1* | 10/2012 | Gupta | H04W 8/082 | 370/229 |
| 2012/0324108 A1* | 12/2012 | Kohli | H04L 69/16 | 709/226 |
| 2012/0324109 A1* | 12/2012 | Kohli | H04L 67/2842 | 709/226 |
| 2012/0324110 A1* | 12/2012 | Kohli | H04L 63/0281 | 709/226 |
| 2013/0007190 A1* | 1/2013 | Kumar | H04L 61/2567 | 709/217 |
| 2013/0182712 A1* | 7/2013 | Aguayo | H04L 12/4633 | 370/395.53 |
| 2014/0036674 A1* | 2/2014 | Agrawal | H04L 69/163 | 370/235 |
| 2014/0092906 A1* | 4/2014 | Kandaswamy | H04L 45/38 | 370/392 |
| 2014/0181267 A1* | 6/2014 | Wadkins | H04L 69/163 | 709/219 |
| 2014/0310392 A1* | 10/2014 | Ho | H04L 69/16 | 709/223 |
| 2014/0359052 A1* | 12/2014 | Joachimpillai | H04L 67/28 | 709/217 |
| 2015/0350068 A1* | 12/2015 | Tung | H04W 80/06 | 370/392 |
| 2016/0205071 A1* | 7/2016 | Cooper | H04L 12/6418 | 726/1 |
| 2016/0301579 A1* | 10/2016 | Djukic | H04L 41/5009 | |
| 2016/0315976 A1* | 10/2016 | Detal | H04L 65/1069 | |
| 2017/0295264 A1* | 10/2017 | Touitou | H04L 69/162 | |

OTHER PUBLICATIONS

"SNIA Examines Standardised Access to Object-Based Disk Drives," SNIA Examines Standardised Access to Object-Based Disk Drives—The Register, 1998-2015, pp. 1-3, http://www.theregister.co.uk/2015/03/26/snia_and_kinetic_drives_standard_object_disk_access.

* cited by examiner

REMOTE SOCKET SPLICING SYSTEM

BACKGROUND

The present disclosure relates generally to information handling systems, and more particularly to performing socket splicing in a remote information handling system such that a proxy information handling system may be removed from data communications between a plurality of other information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In information handling systems networks, proxy information handling systems such as, for example, proxy servers, are sometimes provided as intermediaries for requests from client devices seeking resources from resource servers. In such systems, the client devices may connect to the proxy server, request a service provided by a resource server, and the proxy server may act as a gateway between the resource server and the client to provide the service. For example, a client device may request a file available from a resource server, and the proxy server may forward the request to the resource server and maintain a relay between a first socket on the proxy server that is coupled to client device and a second socket on the proxy server that is coupled to the resource server. When the resource server responds with the requested service (e.g., the file), a proxy application in the proxy server will receive the responses from the resource server through the second socket, copy the responses to a memory buffer, and then forward the responses to the client device through the first socket. Thus, the use of the proxy server requires all responses from the resource server to pass through the proxy server (as well as through a router multiple times when the router connects the proxy server to each of the resource server and the client device) and be processed by the proxy application as discussed above, which introduces inefficiencies in the data communication path between the client device and the resource server while also using up resources in the proxy server.

Conventional attempts to remedy inefficiencies associated with proxy servers include the use of socket splicing. Continuing with the example above, the use of a conventional socket splicing system would allow for the association or "splicing" of the first socket on the proxy server that is coupled to client device with the second socket on the proxy server that is coupled to the resource server, and results in the copying of responses received at the second socket directly to the first socket by the proxy kernel in order to free up the proxy application in the proxy server (e.g., to receive requests from other client devices). Such conventional solutions offload the serving of the resource server response from the proxy application to the proxy kernel, but still utilize proxy server resources while doing nothing to address the inefficiencies resulting from the need to route all of the data communication through the proxy server.

Accordingly, it would be desirable to provide an improved proxy server system.

SUMMARY

According to one embodiment, an information handling system (IHS) includes a communication system that is configured to couple to a first router device; a processing system that is coupled to the communication system; and a memory system that is coupled to the processing system and that includes instruction that, when executed by the processing system, cause the processing system to provide a remote socket splicing engine that is configured to: operate on a first connection through the first router device with a first computing device using the communication system; operate on a second connection through the first router device with a second computing device using the communication system; and send an instruction to perform a socket splicing operation to the first router device using the communication system subsequent to operating on the first connection and the second connection, wherein the instruction to perform the socket splicing operation is configured to cause the first router device to provide a first data path between the first computing device and the second computing device that does not include the communication system.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
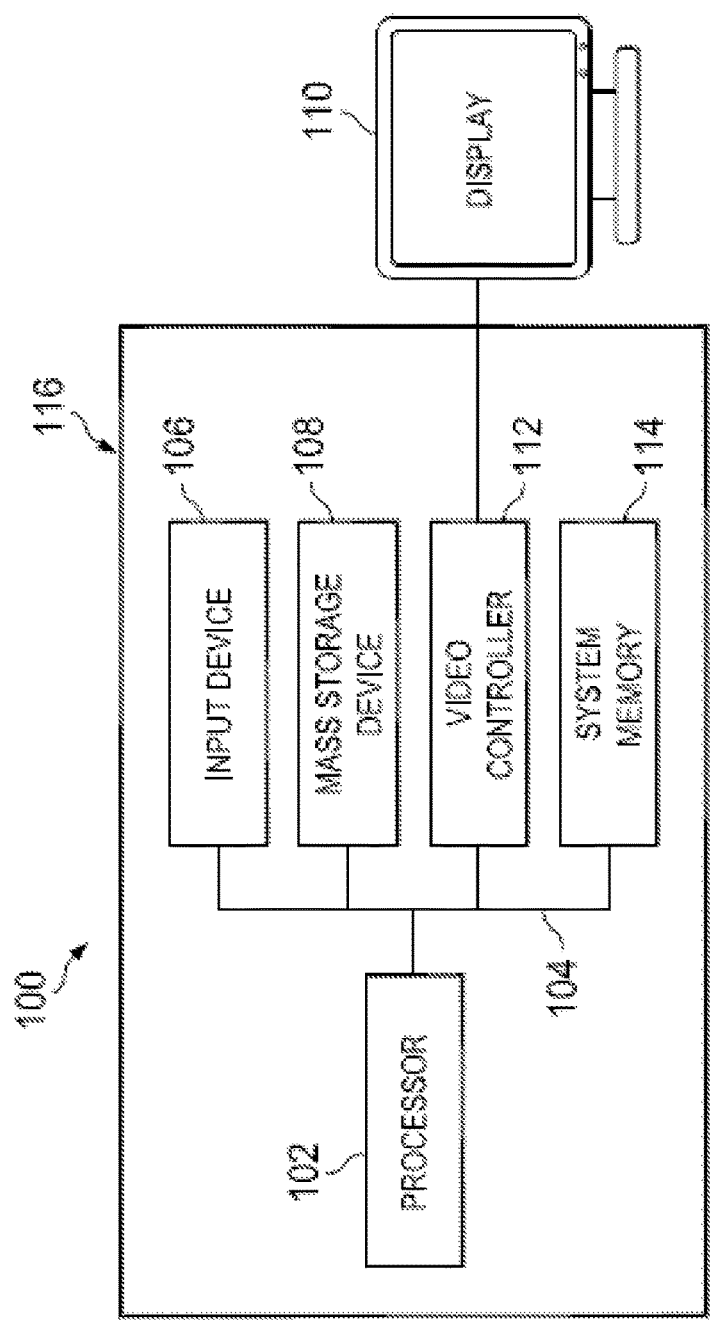
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
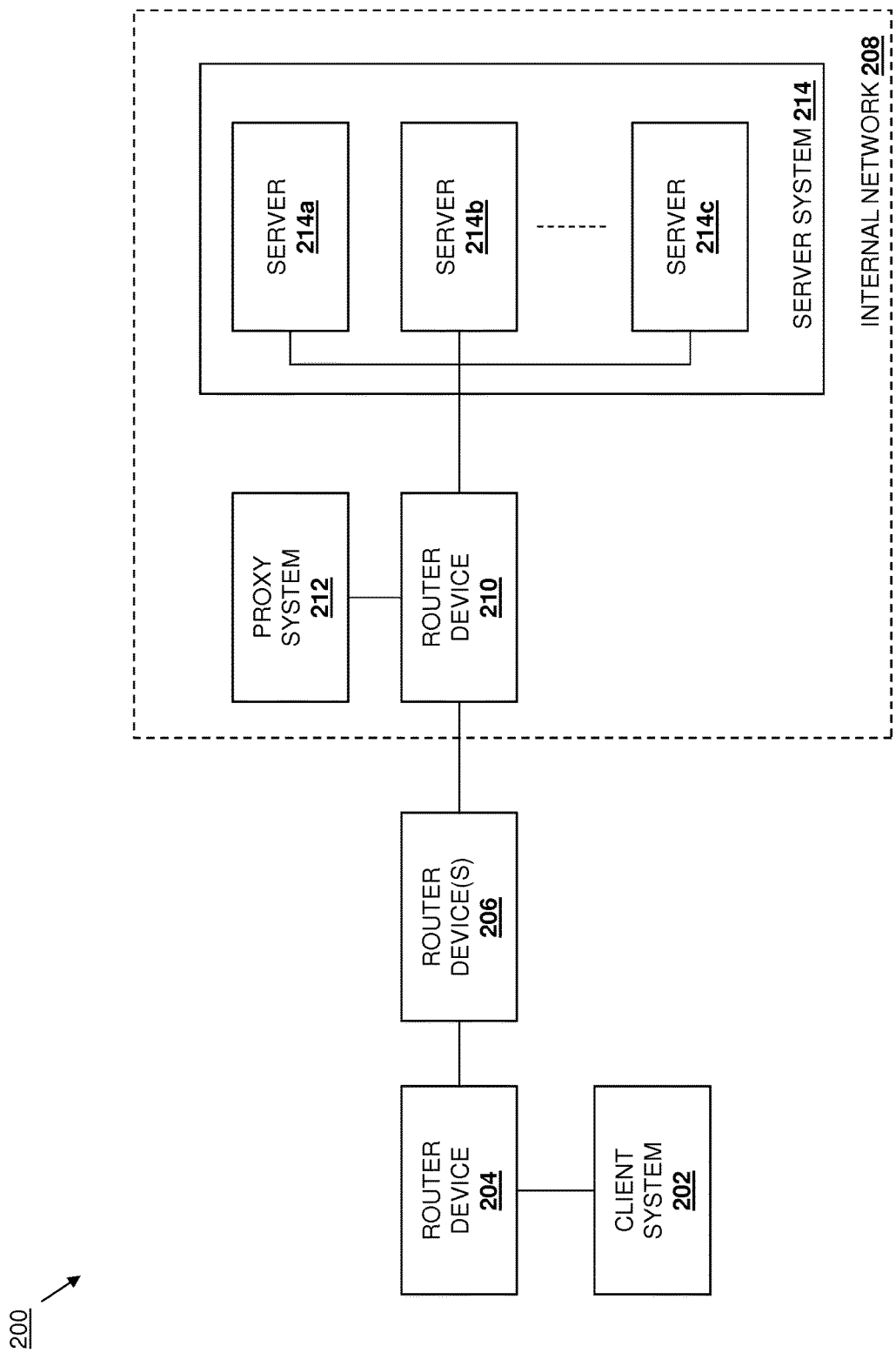
FIG. 2 is a schematic view illustrating an embodiment of a remote socket splicing system.

Referring now to FIG. 2, an embodiment of a remote socket splicing system 200 is illustrated. As discussed below, the remote socket splicing system 200 provides an embodiment of the remote socket splicing of the present disclosure when a client system is communicating with a server system to receive/retrieve a server system resource. However, as discussed below, the remote socket splicing of the present disclosure may be used in a variety of scenarios other than client/server communications. The remote socket splicing system 200 includes a first computing system that, in the embodiment illustrated in FIG. 2, is a client system 202. The client system 202 may be the IHS 100 discussed above with reference to FIG. 1 and/or may include some or all of the components of the IHS 100. For example, the client system 202 may be a desktop computing system, a laptop/notebook computing system, a tablet computing system, a mobile phone, and/or a variety of other computing systems known in the art. The client system 202 is coupled to a router device 204, which may be the IHS 100 discussed above with reference to FIG. 1 and/or may include some or all of the components of the IHS 100. For example, the router device 204 may be a "home" router device that is provided by a user of the client system 202 to allow the client system 202 to access a network such as, for example, the Internet. The router device 204 is coupled to one or more router devices 206 that may each be the IHS 100 discussed above with reference to FIG. 1 and/or may include some or all of the components of the IHS 100. For example, the router device(s) 206 may be router devices that provide the network (e.g., the Internet and/or other networks) that couples the client system 202 to the server system discussed below. While only the router devices 204 and 206 are illustrated in FIG. 2 as coupling the client system 202 to the internal network discussed below, one of skill in the art in possession of the present disclosure will recognize that a number of other networking components may be provided to couple the client system 202 to the server system discussed below while remaining within the scope of the present disclosure.

The router device(s) 206 are coupled to an internal network 208 via a coupling to a router device 210. In the embodiments discussed below, the internal network 208 is provided by a network resource provider such as, for example, a website provider, an application provider, and/or any other network resource providers known in the art. In those embodiments, the router device 210 is an internal router device that is part of the internal network 208 such that it is, for example, controller by the network resource provider that provides the internal network 208. However, the internal network 208 provided by the network resource provider is provided as merely an example, and one of skill in the art in possession of the present disclosure will recognize that the router device 210 and other components of the internal network 208 may be distributed across multiple networks, provided by different entities, and/or otherwise configured in a different manner while remaining within the scope of the present disclosure. The router device 210 is coupled to a proxy system 212 that may be the IHS 100 discussed above with reference to FIG. 1 and/or may include some or all of the components of the IHS 100. For example, the proxy system 212 may be a proxy server (or a plurality of proxy servers) that are configured to handle requests by client systems (e.g., the client system 202) that enter the internal network 208 as discussed below.

The router device 210 is also coupled to a server system 214 that includes a plurality of servers 214a, 214b, and up to 214c. In an embodiment, the servers 214a-c may be the IHS 100 discussed above with reference to FIG. 1 and/or may include some or all of the components of the IHS 100. For example, the server's 214a-c may be resource servers that are configured to provide, by themselves or in combination, responses for resources such as web pages on a website, application data for application(s), files, media, and/or any other network resource known in the art. In a specific example, the server's 214a-c may include Ethernet object-based hard drives for storing of data, although other storage systems are envisioned as falling within the scope of the present disclosure. While a specific embodiment of the internal network 208 has been illustrated and described in FIG. 2, one of skill in the art in possession of the present disclosure will recognize that a number of other network components may be provided in the internal network 208 while remaining within the scope of the present disclosure.

Figure 3:
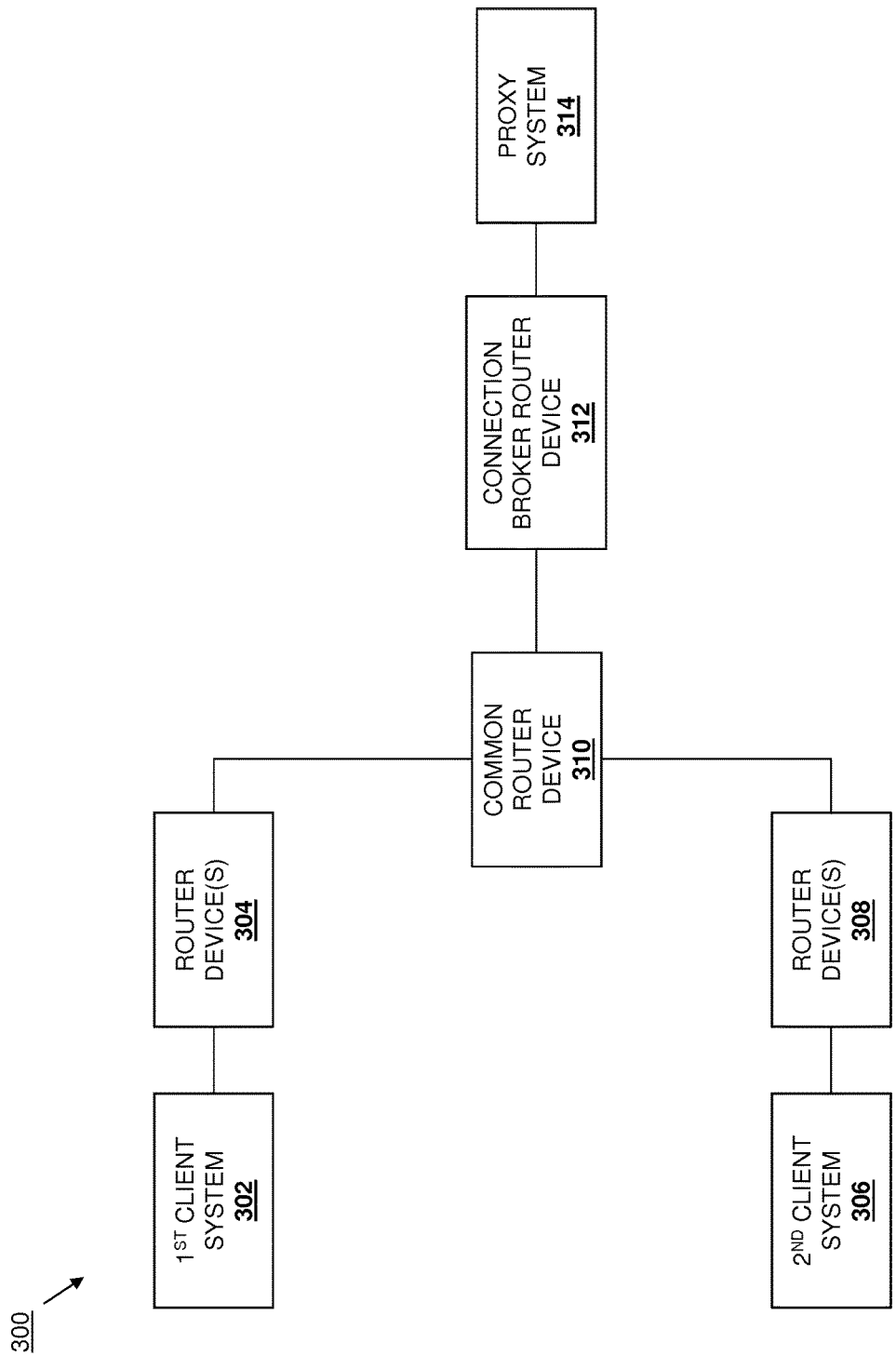
FIG. 3 is a schematic view illustrating an embodiment of a remote socket splicing system.

Referring now to FIG. 3, another embodiment of a remote socket splicing system 300 is illustrated. As discussed below, the remote socket splicing system 300 provides an embodiment of the remote socket splicing of the present disclosure when a client system is communicating with another client system to send and receive data to and from that other client system. However, as discussed below, the remote socket splicing of the present disclosure may be used in a variety of scenarios other than client/client communications. The remote socket splicing system 300 includes a first computing system that, in the embodiment illustrated in FIG. 3, is a first client system 302. The first client system 302 may be the IHS 100 discussed above with reference to FIG. 1 and/or may include some or all of the components of the IHS 100. For example, the first client system 302 may be a desktop computing system, a laptop/notebook computing system, a tablet computing system, a mobile phone, and/or a variety of other computing systems known in the art. The first client system 302 is coupled to one or more router devices 304, which may each be the IHS 100 discussed above with reference to FIG. 1 and/or may include some or all of the components of the IHS 100. For example, the router device(s) 304 may include a "home" router device that is provided by a user of the first client system 302 to allow the first client system 302 to access a network such as, for example, the Internet, which may also include others of the router device(s) 304 that provide at least a portion of that network. However, in other embodiments, the router device(s) 304 may provide a network such as, for example, a corporate network provided by a corporate entity or other or networks provided by other entities known in the art.

The remote socket splicing system 300 also includes a second computing system that, in the embodiment illustrated in FIG. 3, is a second client system 306. The second client system 306 may be the IHS 100 discussed above with reference to FIG. 1 and/or may include some or all of the components of the IHS 100. For example, the second client system 306 may be a desktop computing system, a laptop/notebook computing system, a tablet computing system, a mobile phone, and/or a variety of other computing systems known in the art. The second client system 306 is coupled to one or more router devices 306, which may each be the IHS 100 discussed above with reference to FIG. 1 and/or may include some or all of the components of the IHS 100. For example, the router device(s) 308 may include a "home" router device that is provided by a user of the second client system 306 to allow the second client system 306 to access a network such as, for example, the Internet, which may also include others of the router device(s) 308 that provide at least a portion of that network. However, in other embodiments, the router device(s) 308 may provide a network such as, for example, a corporate network provided by a corporate entity or other networks provided by other entities known in the art. While only router device(s) 304 and 308 are illustrated in FIG. 2, one of skill in the art in possession of the present disclosure will recognize that a number of other networking components may be provided to couple the first client system 302 and the second client system 306 to the proxy system discussed below while remaining within the scope of the present disclosure.

The router device(s) 304 and 308 are coupled to a common router device 310, which may be the IHS 100 discussed above with reference to FIG. 1 and/or may include some or all of the components of the IHS 100. In the embodiments illustrated and discussed below, the common router device 310 is the last router device between the proxy system discussed below and each of the first client system 302 and the second client system 306 and that provides a connection to each of the first client system 302 and the second client system 306. However, as discussed in further detail below, the common router device 310 may be provided between the proxy system discussed below and the last router device that provides a connection to both of the first client system 302 and the second client system 306 while remaining within the scope of the present disclosure. In the illustrated embodiment, the common router device 310 is coupled to a connection broker router device 312 in order to provide an example of connection brokering in the remote socket splicing system 300 in which the connection broker router device 312 forwards remote socket splicing requests to the common router device 310. However, in other embodiments, the common router device 310 may be coupled directly to the proxy system discussed below, or additional router devices may be coupled between the common router device 310 and the connection broker router device 312. The connection broker router device 312 is coupled to a proxy system 314 that may be the IHS 100 discussed above with reference to FIG. 1 and/or may include some or all of the components of the IHS 100. For example, the proxy system 212 may be a proxy server (or a plurality of proxy servers) that are configured to handle requests by client systems (e.g., the first client system 302) to communicate with other client systems (e.g., the second client system 306) as discussed below. While a specific embodiment including the common router device 310, connection broker router device 312, and the proxy system 314 has been illustrated and described in FIG. 3, one of skill in the art in possession of the present disclosure will recognize that a number of other network components may be provided between the first/second client systems 302, 306 and the proxy system 314 while remaining within the scope of the present disclosure.

Figure 4:
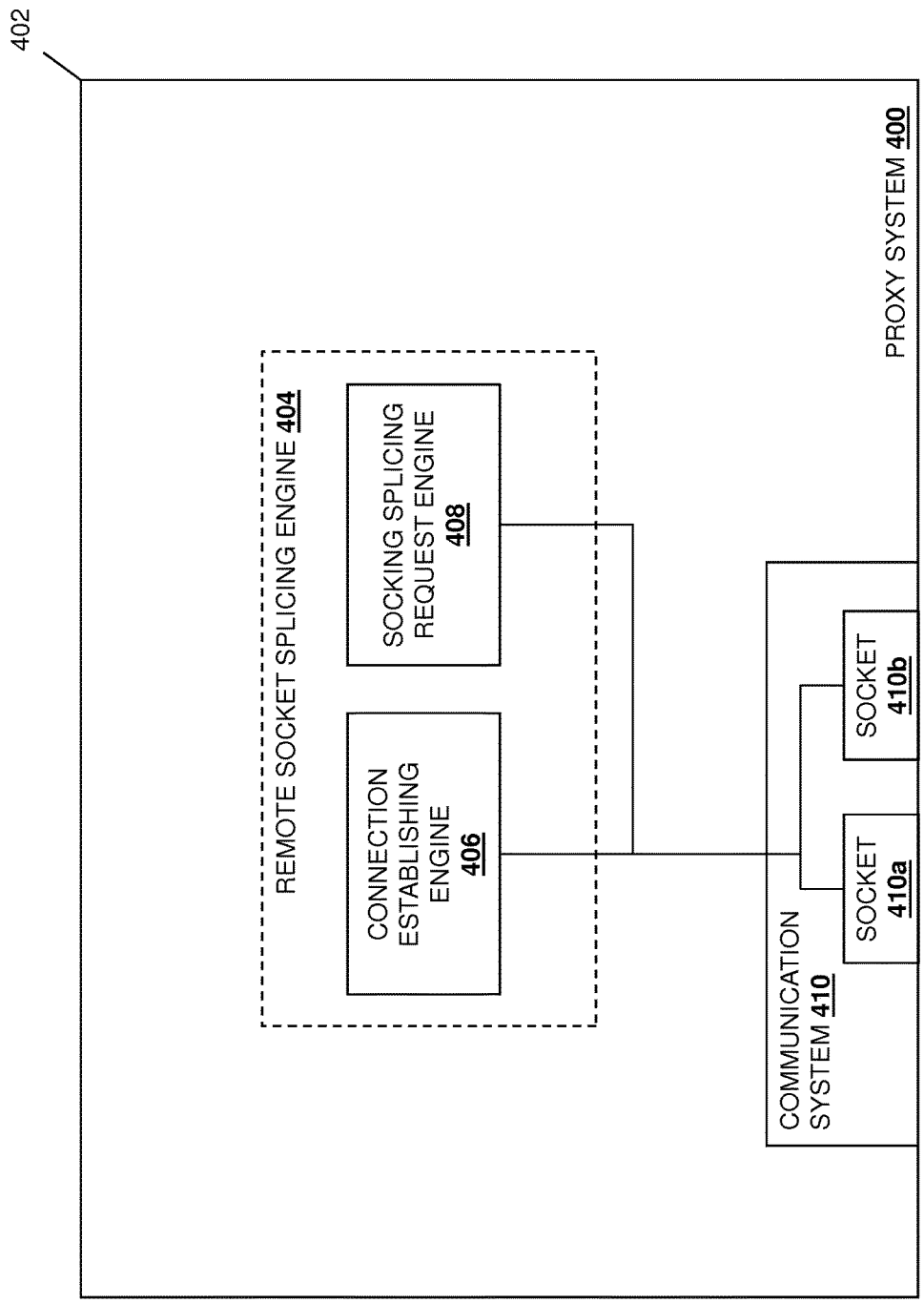
FIG. 4 is a schematic view illustrating an embodiment of a proxy system in the remote socket splicing system of FIG. 2 or FIG. 3.

Referring now to FIG. 4, an embodiment of a proxy system 400 is illustrated that may be the proxy system 212 discussed above with reference to FIG. 2 and/or the proxy system 314 discussed above with reference to FIG. 3. As such, the proxy system 400 may be the IHS 100 discussed above with reference to FIG. 1 and/or may include some or all of the components of the IHS 100. In a specific embodiment, the proxy server 400 is a Session Traversal of User Datagram Protocol (UDP) Through Network Address Translators (NATs) (STUN) server. However, other proxy servers and/or proxy systems are envisioned as falling within the scope of the present disclosure. In the illustrated embodiment, the proxy system 400 includes a chassis 402 that houses the components of the proxy system 400 (e.g., when the proxy system 400 is a proxy server). However, as discussed above, the components of the proxy system 400 may be distributed across multiple chassis (e.g., when the proxy system 400 includes multiple proxy servers) while remaining within the scope of the present disclosure. The chassis 402 may house a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide a remote socket splicing engine 404 that is configured to perform the functions of the remote socket splicing engines and proxy systems discussed below.

In the illustrated embodiment, the remote socket splicing engine 404 is illustrated as including a connection establishing engine 406 that is configured to perform the functions of the connection establishing engines and proxy systems discussed below, and a socket splicing request engine 408 that is configured to perform the functions of the socket splicing request engines and proxy systems discussed below. However, the functionality of the connection establishing engine 406 and the socket splicing request engine 408 may be combined into a single engine or split into further engines while remaining within the scope of the present disclosure. The remote socket splicing engine 404 is coupled to a communication system 410 (e.g., via a coupling between the processing system and the communication system 410). The communication system 410 may include a variety of communication components (e.g., a network interface controller (NIC), a wireless communication device, and/or other communication systems known in the art) that are configured to couple the proxy system 400 to the router devices as described herein. In the illustrated embodiment, the communication system 410 includes a plurality of sockets 410a and 410b that may be used to provide connections to computing devices in the examples discussed below. While a specific proxy system 400 has been illustrated and described, one of skill in the art in possession of the present disclosure will recognize that the proxy system 400 may include a variety of other components for enabling the functionality discussed below while remaining within the scope of the present disclosure.

Figure 5:
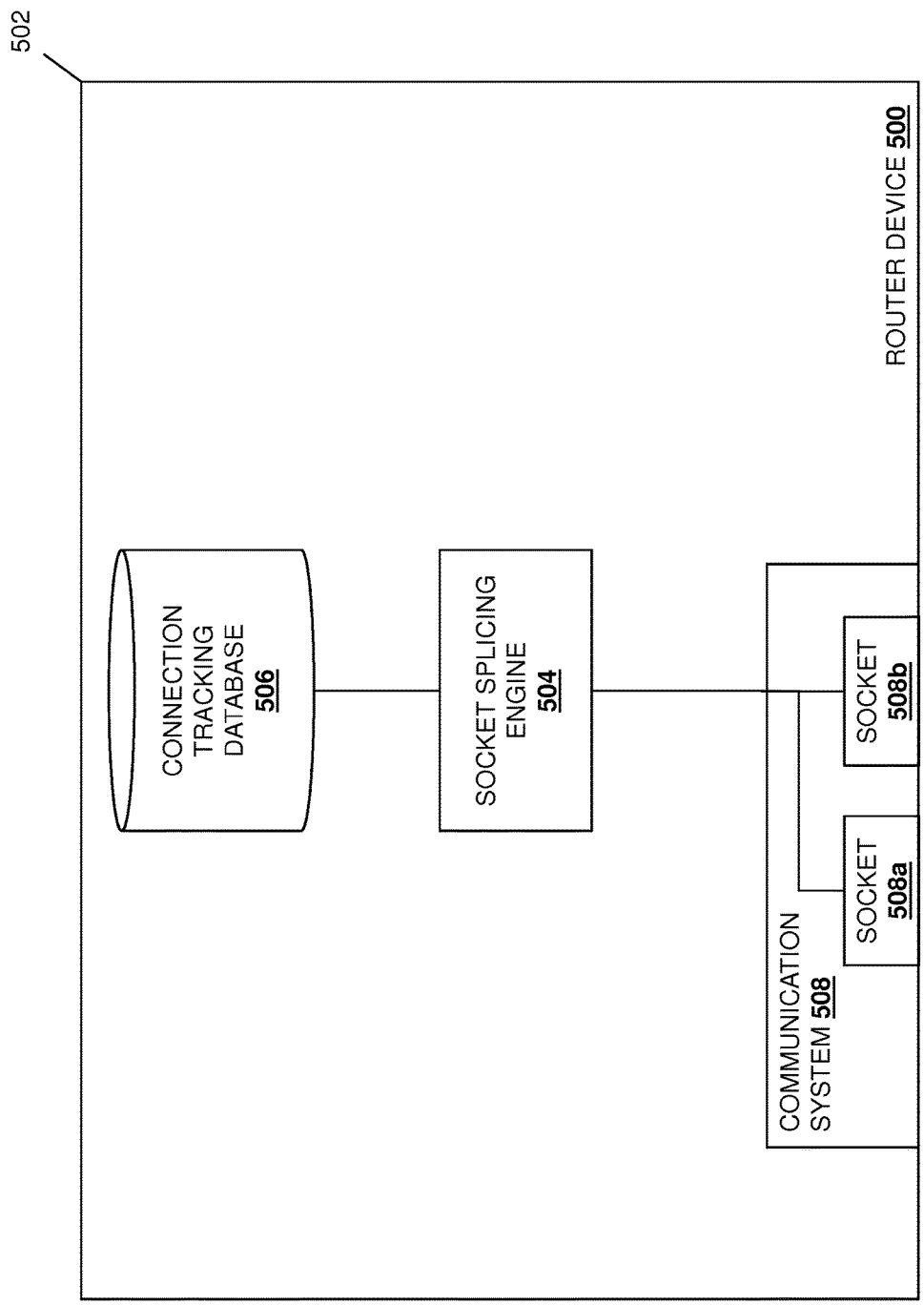
FIG. 5 is a schematic view illustrating an embodiment of a router device in the remote socket splicing system of FIG. 2 or FIG. 3.

Referring now to FIG. 5, an embodiment of a router device 500 is illustrated that may be the router device 210 discussed above with reference to FIG. 2, the connection broker router device 312 and/or the common router device 310 discussed above with reference to FIG. 3, and/or other router devices in the embodiments discussed below. As such, the router device 500 may be the IHS 100 discussed above with reference to FIG. 1 and/or may include some or all of the components of the IHS 100. In the illustrated embodiment, the router device 500 includes a chassis 502 that houses the components of the router device 500. The chassis 502 may house a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide a socket splicing engine 504 that is configured to perform the functions of the socket splicing engines and router devices discussed below.

The chassis 502 may also house a storage device (not illustrated, but which may include the storage device 108 discussed above with reference to FIG. 1) that is coupled to the socket splicing engine 504 (e.g., via a coupling between the processing system and the storage system) and that includes a connection tracking database 506. As discussed below, the connection tracking database 506 may include a variety of data and/or information to track connections provided by the router device 500 between computing devices in the remote socket splicing systems of the present disclosure. The socket splicing engine 504 is also coupled to a communication system 508 (e.g., via a coupling between the processing system and the communication system 508). The communication system 410 may include a variety of communication components (e.g., a network interface controller (NIC), a wireless communication device, and/or other communication systems known in the art) that are configured to couple the router device 500 to the proxy systems, servers, other router devices, and/or client devices as described herein. In the illustrated embodiment, the communication system 508 includes a plurality of sockets 508a and 508b that may be used to provide connections to computing devices in the examples discussed below. While a specific router device 500 has been illustrated and described, one of skill in the art in possession of the present disclosure will recognize that the router device 500 may include a variety of other components for enabling the functionality discussed below while remaining within the scope of the present disclosure.

Figure 6A:
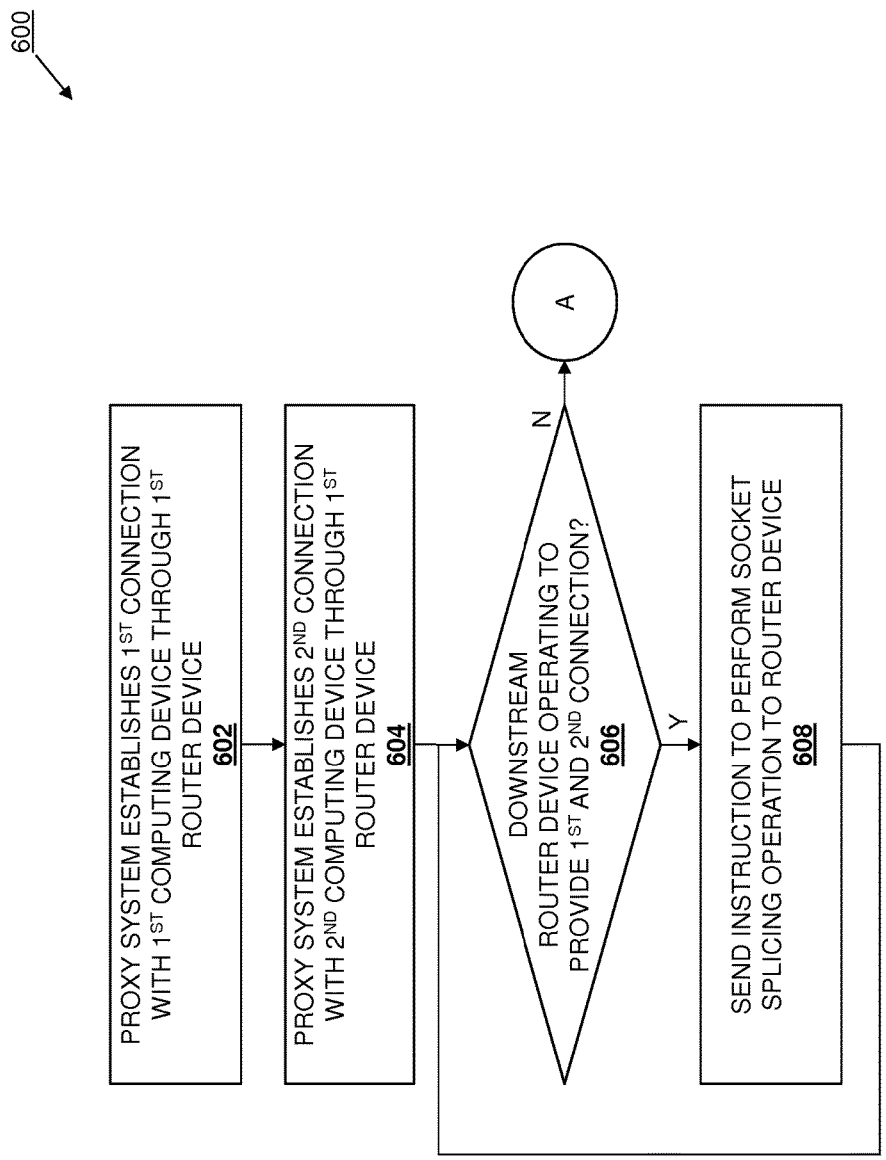
FIG. 6*a* is a flow chart illustrating an embodiment of a portion of a method for providing remote socket splicing.
Figure 6B:
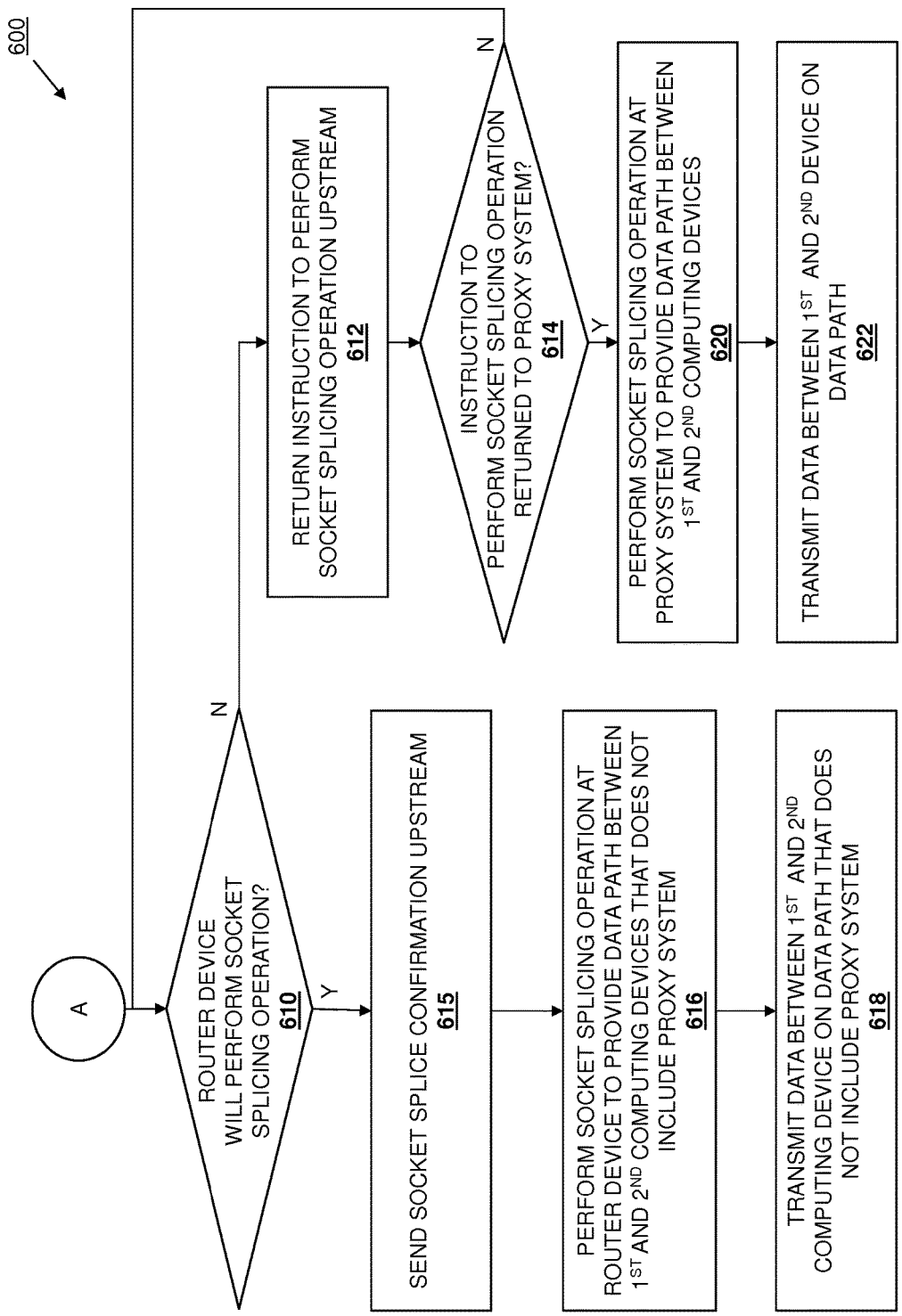
FIG. 6*b* is a flow chart illustrating an embodiment of a portion of a method for providing remote socket splicing.

Referring now to FIGS. 6a and 6b, an embodiment of a method 600 for performing remote socket splicing is illustrated. As discussed in detail below, the method 500 provides a proxy system that establishes connections between two computing devices in order to allow, for example, one of the computing devices to provide a response to the other computing device; to allow the two computing devices to communicate; and/or for a variety of other connection functionality known in the art. However, subsequent to establishing those connections, the proxy system operates to determine whether it can be removed from the subsequent data communication between those computing devices by sending an instruction to perform a socket splicing operation to a downstream router device. The downstream router device is configured to perform the socket splicing operation that "splices" or otherwise associates sockets on the router device that are connected to the computing devices such that a data path is provided between the computing devices that does not include the proxy system. Subsequent data communications may then be handled by the spliced sockets in the router device, removing the proxy system from the data path and leaving the proxy system free to handle requests, responses, and/or other communications from other devices. Router devices in the system may also be configured to forward the instruction to perform the socket splicing operation downstream to router devices that route each of the connections to the computing devices so that the socket splicing operation may be performed closer to the computing devices to provide further efficiencies in the use of the router devices. In the discussion below, the method 600 is initially described with regard to the remote socket splicing systems 200 and 300 discussed above with reference to FIGS. 2 and 3, followed by a discussion of some specific embodiments illustrated in the flow diagrams in FIGS. 7, 8, 9, and 10. However, one of skill in the art in possession of the present disclosure will recognize that combinations of the embodiments discussed below will fall within the scope of the present disclosure.

The method 600 begins at block 602 where a proxy system establishes a first connection with a first computing device through a first router. In an embodiment, at block 602, a first client device may send a data connection request through at least one router device to a proxy system. For example, with reference to the remote socket splicing system 200 of FIG. 2, the client system 202 may send a data connection request to retrieve a web page, a file, media, an application, and/or other data connection request objects known in the art, and that data connection request may be routed through the router device 204, the router device(s) 206, and the router device 210 to the proxy system 212. In a specific example, the remote socket splicing systems and methods of the present disclosure may be particularly beneficial in handling large responses from servers (e.g., the server 214a) that are provided following a request by a client device (e.g., the client device 202), such as a request for a video file or other large sized files known in the art.

However, any other requests and responses are envisioned as falling within the scope of the present disclosure.

In another example, with reference to the remote socket splicing system 300 of FIG. 3, the first client system 302 may send a data connection request to communicate with the second client system 306, establish a connection with the second client system 306, and/or to provide other data connection request functionality known in the art, and that data connection request may be routed through the router device(s) 304, the common router device 310, and the connection broker router device 312 to the proxy system 314. In some embodiments of the method 600 utilizing the remote socket splicing system 300 illustrated in FIG. 3, the first client system 302 may provide a token with the data connection request that identifies, authorizes, or otherwise indicates that the first client system 302 would like to establish a connection with the second client system 306. In a specific example, the remote socket splicing systems and methods of the present disclosure may be particularly beneficial in handling large data communications between client devices (e.g., the first client device 302 and the second client device 306), such as a video conferencing and/or other data intensive communication techniques known in the art. However, any other data communications are envisioned as falling within the scope of the present disclosure.

The connection establishing engine 406 in the proxy system 400 (which may be either of the proxy systems 200 and 300) receives the data connection request through the communication system 410 and operates to establish a first connection with the client system 202 or first client system 302 through the router devices. As discussed below with reference to FIGS. 7-10, the establishment of the first connection with the client system 202 or first client system 302 may include a transmission control protocol (TCP) "3-way handshake" to set up a TCP/Internet Protocol (TCP/IP) connection. As such, the establishment of the first connection at block 602 may include the exchange of synchronization (SYN) packets, SYN-acknowledgement (SYN-ACK) packets, and ACK packets to establish that first connection. However, other types of connections may be established utilizing other protocols while remaining within the scope of the present disclosure. In an embodiment, the socket 410a in the communication system 410 may be utilized by the proxy system 400 to establish the first connection to the first computing device.

The method 600 then proceeds to block 604 where the proxy system establishes a second connection with a second computing device through the first router. In an embodiment, at block 604, the proxy system may send a data connection request through at least one router device to the second computing device. For example, with reference to the remote socket splicing system 200 of FIG. 2, the proxy system 212 may send a data connection request to retrieve a web page, a file, media, an application, and/or other data connection request objects known in the art, and that data connection request may be routed through the router device 210 to one or more of the servers 214a-c in the server system 214.

In another embodiment, at block 604, the second computing device may send a data connection request through at least one router device to the proxy system. For example, with reference to the remote socket splicing system 300 of FIG. 3, the second client system 306 may send a data connection request to communicate with the first client system 302, establish a connection with the first client system 302, and/or to provide other data connection request functionality known in the art, and that data connection request may be routed through the router device(s) 308, the common router device 310, and the connection broker router device 312 to the proxy system 314. In some embodiments of the method 600 utilizing the remote socket splicing system 300 illustrated in FIG. 3, the second client system 306 may provide a token with the data connection request that identifies, authorizes, or otherwise indicates that the second client system 306 would like to establish a connection with the first client system 302.

With reference to the remote socket splicing system 200 of FIG. 2, the connection establishing engine 406 in the proxy system 400 (which may be the proxy system 200) may send the data connection request through the communication system 410 to the one or more of the server's 214a-c in the server system 214, and then operate to establish a second connection one or more of the server's 214a-c in the server system 214 through the router device 210. With reference to the remote socket splicing system 300 of FIG. 3, the connection establishing engine 406 in the proxy system 400 (which may be the proxy system 300) may receive the data connection request through the communication system 410 from the second client system 306, and then operate to establish a second connection with the second client system 306 through the router devices. Similarly as discussed above, as described below with reference to FIGS. 7-10, the establishment of the second connection with the one or more of the servers 214a-c in the server system 214 or the second client system 306 may include a TCP "3-way handshake" to set up a TCP/IP connection. As such, the establishment of the second connection at block 602 may include the exchange of SYN packets, SYN-ACK packets, and ACK packets to establish that second connection. However, other types of connections may be established utilizing other protocols while remaining within the scope of the present disclosure. In an embodiment, the socket 410b in the communication system 410 may be utilized for the second connection to the second computing device. Furthermore, while the first connection an the second connection have been described as being established by the proxy system, the connections to the first computing device and the second computing device may be established in any other manner by any other subsystem while remaining within the scope of the present disclosure, and the proxy system may then operate on those established connections as described herein.

As discussed above, subsequent communications using the first connection to the first computing device and the second connection to the second computing device that were established by the proxy system are generally inefficient. For example, as can be seen in FIG. 2, the use of the first connection and the second connection established by the proxy system 212 would result in communications from the client system 202 to the server 214a being be routed through the router device 210 to the proxy system 212, and then back through the router device 210 to the server 214a, while responses from the server 214a to the client system 202 would be routed through the router device 210 to the proxy system 212, and then back through the router device 210 to the client system 202. Similarly, as can be seen in FIG. 3, the use of the first connection and the second connection established by the proxy system 314 would result in communications from the first client system 302 to the second client system 306 being be routed through the common router device 310 and the connection broker router device 312 to the proxy system 312, and then back through the common router device 310 and the connection broker router device 312 to the second client system 306, while communications from the second client system 306 to the first client system 302 would be routed through the common router device 310 and the connection broker router device 312 to the proxy system 314, and then back through the common router device 310 and the connection broker router device 312 to the first client system 302. However, as discussed below, after providing the next-hop connections, sending any initial requests, and/or otherwise establishing the connections between the first computing device and the second computing device, the proxy system then determines whether it needs to interact directly in the data communications between the first computing device and the second computing device and, if not, passes the handling of those data communications to a downstream router device such that the proxy system does not participate in those subsequent data communications.

The method 600 then proceeds to decision block 606 and block 608 where it is determined whether a downstream router is operating to provide the first connection with the first computing device and the second connection to the second computing device and, if so, an instruction to perform a socket splicing operation is sent to a router device. In the discussions below, the "downstream" router devices are router devices that are "closer" to the first computing device and the second computing device than the proxy system or router device that is performing decision block 606. For example, in the remote socket splicing system 200 of FIG. 2, the router device 210 is "closer" to the client system 202 and the server 214*a* than the proxy system 212 in that the router device 210 is connected to the client system 202 and the server 214*a* by fewer connections and/or devices than the proxy system 212. Similarly, in the remote socket splicing system 300 of FIG. 3, the connection broker router device 312 is "closer" to the first client system 302 and the second client system 306 than the proxy system 314 in that the connection broker router device 312 is connected to the first client system 302 and the second client system 306 by fewer connections and/or devices than the proxy system 314, and the common router device 312 is "closer" to the first client system 302 and the second client system 306 than the connection broker router device 312 in that the common router device 310 is connected to the first client system 302 and second client system 306 by fewer connections and/or devices than the connection broker router device 312. However, while the method 600 discusses "downstream" router devices using such conventions, router devices selected for remote socket splicing operations may be selected based on other criteria. For example, router devices may be selected based on network bandwidth (e.g., providing fewer data paths than the proxy system or router device that is performing decision block 606), processing bandwidth (e.g., performing fewer processing operations than the proxy system or router device that is performing decision block 606), and/or other resource issues other than or in addition to their physical or virtual distance from the computing devices.

In one embodiment of decision block 606, the socket splicing request engine 408 in the proxy system 400 may determine whether a downstream router device is operating to provide the first connection and the second connection by referencing a connection database (not illustrated, but which may be provided on a storage device that is included in the proxy system 400 and coupled to the processing system). For example, during the establishment of the first connection and the second connection at blocks 602 and 604, the proxy system 400 may collect information about the router device(s) operating to help provide those connections, and store that information in the connection database in the proxy system 400. Once the first connection to the first computing device and the second connection to the second computing device have been established, at decision block 606 the socket splicing request engine 408 may review the connection database determine whether there are any router device(s) operating to provide both the first connection and the second connection and, if so, send the instruction to perform a socket splicing operation to that router device at block 608.

In an embodiment, the instruction to perform the socket splice operation may be provided in a remote socket splice packet that identifies the first connection to the first computing device and the second connection to the second computing device. For example, each of the first connection to the first computing device and the second connection to the second computing device may be defined by two endpoints: a source (SRC) and a destination (DST). In a specific example, a TCP version 4 (TCPv4) endpoint may be defined as a port and an address, and thus a connection between two TCPv4 endpoints may be defined by a SRC port, a SRC address, a DST port, and a DST address. In this specific example, the remote socket splice packet may include a first SRC port (i.e., for the first computing device), a first SRC address (i.e., for the first computing device), a first DST port (i.e., for the first computing device), a first DST address (i.e., for the first computing device), a second SRC port (i.e., for the second computing device), a second SRC address (i.e., for the second computing device), a second DST port (i.e., for the second computing device), a second DST address (i.e., for the second computing device). In many embodiments, the first DST address and the second SRC address will likely both be the address of the proxy system, but in other embodiments need not be the same address. While a specific instruction to perform the socket splice operation/remote socket splice packet has been described for TCPv4 endpoints, other protocols and/or protocol versions utilizing other types of instructions to perform the socket splice operation/provide the remote socket splice packet are envisioned as falling within the scope of the present disclosure.

In another embodiment of decision block 606 and block 608, the socket splicing request engine 408 in the proxy system 400 may determine whether a downstream router device is operating to provide the first connection and the second connection at decision block 606 by sending the instruction to perform the socket splicing operation to the router device at block 608. In other words, rather than review a connection database and/or collect details about the first connection and second connection, the socket splicing request engine 408 in the proxy system 400 may simply send the remote socket splicing packet (or other instruction to perform the socket splicing operation) to a downstream router device and wait for a response to determine whether that router device will be able to perform the socket splicing operation (discussed in further detail below). As such, in some embodiments, the proxy system 400 may include a connection database that allows it to determine whether to send the instruction to perform the socket splicing operation, while in other embodiments, the proxy system 400 may simply send the instruction to perform the socket splicing operation and wait for a response.

Following the sending of the instruction to perform the socket splicing operation at block 608, the method 600 returns to decision block 606 where it is again determined whether a downstream router is operating to provide the first connection to the first computing device and the second connection to the second computing device. However, after the initial sending by the proxy system of the instruction to perform the socket splicing operation, the subsequent performance(s) of decision block 606 and block 608 may be performed by router devices. As such, the first router device that received the instruction to perform the socket splicing operation from the proxy system following the initial performance of block 608 will then determine at the subsequent performance of decision block 606 whether there is a downstream second router device operating to provide the first connection and second connection and, if so, send the instruction to perform the socket splicing operation to that second router device at the subsequent performance of block 608. Similarly, the second router device that received the instruction to perform the socket splicing operation from the first router device will then determine at the subsequent performance of decision block 606 whether there is a downstream third router device operating to provide the first connection and second connection and, if so, send the instruction to perform the socket splicing operation to that third router device at the subsequent performance of block 608, as so on. As such, the method 600 loops through decision block 606 and block 608 to forward the instruction to perform the socket splicing operation from the proxy system to the downstream router device that is "closest" to the first computing device and the second computing device and/or includes the other desired router device characteristics discussed above.

As discussed below, router devices may perform network address translation (NAT) and, in such embodiments, a router device sending the instruction to perform the socket splicing operation to a downstream router may modify that instruction to take into account any NAT that was performed in that router device and/or that was represented in the instruction that was received by that router device. In such embodiments, if the instruction is performed subsequently downstream, that router will then delete any spliced connection tracking entry (discussed in further detail below) in its connection tracking database. For example, as described below, when NAT is used by router devices operating according to the method 600, a NAT entry for the spliced socket connection may be created and existing NAT entries in the router device for the connections associated with that spliced socket connection may be deleted. Furthermore, communications (e.g., the spoofed resets discussed below, a "splice completed message", etc.) may be provided upstream to each router devices that delegated the socket splicing operation, and those communications may be modified (e.g., by modifying the spoofed resets, modifying addresses in the "splice completed" message, etc.) as needed.

For example, with reference to FIG. 2, at decision block 606 and block 608, the proxy system 212 may send the instruction to the router device 210, and as the router device 210 is the downstream router that is "closest" to the client system 202 and the server 214*a*, at the subsequent performance of decision block 606, the method 600 may proceed to decision block 610, discussed in further detail below. In another example, with reference to FIG. 3, at decision block 606 and block 608, the proxy system 314 may send the instruction to the connection broker router device 312, and the connection broker router device 312 may then forward the instruction to the common router device 310 at the subsequent performance of decision block 606 and block 608. As the common router device 310 is the downstream router that is "closest" to the first client system 302 and the second client system 306, at the subsequent performance of decision block 606, the method 600 may proceed to decision block 610, discussed in further detail below.

If, at decision block 606, it is determined that there are no downstream routers are operating to provide the first connection to the first computing device and the second connection to the second computing device, the method 600 then proceeds to decision block 610 where it is determined whether the router device will perform the socket splicing operation. In an embodiment, any router device receiving the instruction to perform the socket splicing operation may determine whether it can perform the socket splicing operation at decision block 610. For example, referring to FIG. 5, at block 608, the socket splicing engine 504 in the router device 500 (which may be any of the router devices in the remote socket splicing systems 200 and 300) may receive the instruction to perform the socket splicing operation through the communication system 508. In response to receiving the instruction to perform the socket splicing operation, the socket splicing engine 504 may access the connection tracking database 506 and identify, confirm, and/or otherwise determine whether the first connection to the first computing device and the second connection to the second computing device are included as connection tracking entries in the connection tracking database 506 (i.e., whether the router device 500 is providing the first connection to the first computing device via the socket 508*a* and the second connection to the second computing device via the socket 508*b*.)

In some embodiment, the socket splicing engine 504 in the router device 500 may take into account that some endpoints (e.g., client systems, servers, etc.) may have had network address translation (NAT) performed and, in response, the socket splicing engine 504 may query the connection tracking database 506 as if a packet were to be sent to its destination as per the NAT in order to be able to match the address upon which NAT was performed to the connection of interest. For example, one or more of the router devices may receive the instruction to perform the socket splicing operation, and an address in that socket splicing operating (e.g., a SRC address) may not correspond to an established connection (e.g., because the router device uses source NAT that causes the packet to appear to come from a different source than it actually came from). In such an example, that router device may determine a SRC address from a modified SRC address in the instruction to perform the socket splicing operation (e.g., by querying the connection tracking database 506 using the modified SRC address, as that operation is defined in the router device and will allow for discovery of the unmodified SRC address). In response to the first connection and the second connection not being included as connection tracking entries in the connection tracking database 506, the socket splicing engine 504 may determine that it cannot perform the socket splicing operation. However, while the router device 500 is discussed as indicating that it will not perform the socket splicing operation because it is not providing the first connection and the second connection, the router device 500 may not be able to perform the socket splicing operation due to one or both of the connections being in a "shutdown" state, router device resource issues, the router device being a load balancing router device associated with packets that may be sent over different paths (e.g., because the socket splicing may require that the packets all pass through that router device), and/or any of a variety of issues known in the art that would prevent the socket splicing operations from being performed.

If at decision block 610 it is determined that the router device will not perform the socket splicing operation, the method 600 proceed to block 612 where the instruction to perform the socket splicing operation is returned upstream. In an embodiment, in response to determining that the router device 500 will not perform the socket splicing operation, the socket splicing engine 504 may send a socket splicing failure message upstream (i.e., back to the device that sent/forwarded the instruction to perform the socket splicing operation.) In some embodiment, the socket splicing failure message may include the instruction to perform the socket splicing operation. However, in other embodiments, the upstream device or system may have saved the instruction to perform the socket splicing operation, and the socket splicing failure message may cause that upstream device or system to retrieve that saved instruction. As such, the "returning" of the instruction to perform the socket splicing operation may include the actual sending of that instruction to the upstream device or system, the causing of that upstream device or system to review that instruction, and/or any other action that may provide the functionality described below.

The method 600 then proceeds to decision block 614 where it is determined whether the instruction to perform the socket splicing operation has returned to the proxy system. In an embodiment, the returning of the instruction to perform the socket splicing operation upstream may cause that instruction to be returned to a router device or the proxy system. The returning of the instruction to perform the socket splicing operation upstream to the proxy system will be discussed in further detail below with regard to blocks 620 and 622. However, if the returning of the instruction to perform the socket splicing operation upstream causes that instruction to be returned to a router device, the method 600 returns to decision block 610 where that router device determines whether it will perform the socket splicing operation substantially as discussed above. As such, the method 600 may loop through decision block 610, block 612, and decision block 614 until either a router device is found that will perform the socket splicing operation, or else the instruction is returned to the proxy system.

Continuing the example discussed above with reference to FIG. 2, in some embodiment of blocks 606 and 608, the router device 210 may have sent the instruction to perform the socket splicing operation to one of the router devices 206. At decision block 610, that router device 206 will determine that it will not perform the socket splicing operation (e.g., because it does not provide a connection to the server 214*a*) and it will return the instruction to perform the socket splicing operation to the router device 210. The method 600 will then proceed to decision block 614 where it will be determined that the instruction to perform the socket splicing operation has not returned to the proxy system 212, and the method 600 will return to decision block 610 where it is determined whether router device 210 will perform the socket splicing operation. If so, the method will proceed to block 616. If not, the method 600 will proceed to block 612 where the router device 210 will return the instruction to perform the socket splicing operation to the proxy system 212, the method 600 will proceed to decision block 614 where it will be determined that the instruction has been returned to the proxy system 212, and the method 600 will then proceed to block 620.

Continuing the example discussed above with reference to FIG. 3, in some embodiment of blocks 606 and 608, the common router device 310 may have sent the instruction to perform the socket splicing operation to one of, or one of each of, the router devices 304 and/or 308. At decision block 610, the router device(s) 304 and/or 308 may determine that they will not perform the socket splicing operation (e.g., because they do not provide a connection to the first client system 302 or second client system 306) and they will return the instruction to perform the socket splicing operation to the common router device 310. The method 600 will then proceed to decision block 614 where it will be determined that the instruction to perform the socket splicing operation has not returned to the proxy system 212, and the method 600 will return to decision block 610 where it is determined whether common router device 310 will perform the socket splicing operation. If so, the method will proceed to block 616. If not, the method 600 will proceed to block 612 where the common router device 310 will return the instruction to perform the socket splicing operation to the connection broker router device 312, the method 600 will proceed to decision block 614 where it will be determined that the instruction has not returned to the proxy system 212, and the method 600 will return to decision block 610 where it is determined whether connection broker router device 312 will perform the socket splicing operation. If so, the method will proceed to block 616. If not, the method 600 will proceed to block 612 where the connection broker router device 312 will return the instruction to perform the socket splicing operation to the proxy system 314, the method 600 will proceed to decision block 614 where it will be determined that the instruction has been returned to the proxy system 314, and the method 600 will then proceed to block 620.

At block 615, a socket splice confirmation is sent upstream. In an embodiment, the socket splicing engine 504 may sent a socket splice confirmation or other splicing success message through the communication 508 upstream through the router devices to the proxy system to inform the router devices and/or the proxy system that the socket splicing operation has been performed. As discussed in further detail below, in some embodiments of block 615, the socket splicing engine 504 may also generate and send "spoofed" or "faked" resets on existing connections to cause the proxy system to shut down the connections to the first and second computing device, and to inform intermediate routers that the proxy server is no longer part of the communications between the first and second computing device. For example, a reset message provided in a TCPv4 communication may have a RST flag set.

The method 600 then proceeds to block 616 where a socket splicing operation is performed at the router device to provide a data path between the first computing device and the second computing device that does not include the proxy system. In an embodiment, at block 616 the socket splicing engine 504 may perform the socket splicing operation by coupling, "splicing", and/or otherwise associating the socket 508*a* (through which the first connection to the first computing device is provided) with the socket 508*b* (through which the second connection to the second computing device is provided). In an embodiment, the socket splicing by the router device 500 associates the socket 508*a* and the socket 508*b* and instructs a splice kernel to perform the operation(s) necessary to provide a data path through the router device 500 that transmits data between the first computing device and the second computing device (e.g., by copying data between the sockets 508*a* and 508*b*). In an embodiment, the socket splicing engine 504 may have received the instruction to perform the socket splicing operation at block 608, and found a match between the connections in that instruction with the connection in the connection tracking database 506 at decision block 610.

At block 616, the socket splicing engine 504 may then construct a spliced connection tracking entry and store that spliced connection tracking entry in the connection tracking database 506. For example, the spliced connection tracking entry may be a single Network Address Translation (NAT) entry constructed out of the connection tracking entries for the first connection and the second connection, and may provide that packets for the first SRC and the first DST are mapped to be packets from the second SRC and the second DST, and packets from the second DST and second SRC are mapped to be packets from the first DST and the first SRC. In some embodiment, the spliced connection tracking entry may provide a first DST address and a second SRC address that are the same, but the associated port numbers are unlikely to match. In some embodiment, the socket splicing engine 504 may provide corrections to the TCP sequence numbers for the connections in each direction. However, other protocol implementations are envisioned as falling within the scope of the present disclosure as well.

Following the creation of the spliced connection tracking entry, the socket splicing engine 504 may remove the connection tracking entries for the first connection to the first computing device and the second connection to the second computing device from the connection tracking database 506 (i.e., because those connections are now represented by the spliced connection tracking entry). In an embodiment, the socket splicing engine 504 may then send a splice request acknowledgement to the proxy system to confirm that the socket splice operation was performed. In response to receiving the splice request acknowledgement, the proxy system may then close the first connection to the first computing device (e.g., via the socket 410a) and the second connection to the second computing device (e.g., via the socket 410b). As such, the proxy system will no longer be a part of the data path between the first computing device and the second computing device that is provided, at least in part, by the spliced sockets in the router device. In some embodiments, spoofed reset messages (e.g., as described above with reference to block 615) may also be sent upstream to router devices. For example, router devices that track connections but that do not support socket splicing may received the spoofed reset messages and remove the associated connection tracking entries.

The method 600 will then proceed to block 618 where data is transmitted between the first computing device and the second computing device on the data path that does not include the proxy system. In an embodiment, the first computing device and/or the second computing device may send data communication to the other computing device, and in response those data communications will travel (e.g., via the other router device(s)) to the router device that has provided the spliced sockets, and the data communication will traverse that router device via those spliced sockets such that it reaches that other computing device without being handled by the proxy system. In some embodiment, the router device that has provided the spliced sockets may use network address translation (NAT), and may adjust TCP sequence numbers as packets that are part of the data communication are relayed. For example, adjustment of TCP sequence numbers may be performed using protocol helpers that insert or remove bytes from the communication stream as is known in the art.

Continuing the example discussed above with reference to FIG. 2, the router device 210 may perform the socket splicing operation at block 616 such that a data path is provided between the client system 202 and the sever 214a that does not include the proxy system 212. Subsequently, at block 618, when the server 214a provides responses to the request from the client system 202, those responses will traverse the router device 210 via the spliced sockets (e.g., sockets 508a and 508b), as well as each of the router devices 206 and 204, to reach the client system. Continuing the example discussed above with reference to FIG. 3, the common router device 310 may perform the socket splicing operation at block 616 such that a data path is provided between the first client system 302 and the second client system 306 that does not include the proxy system 314 (or the connection broker router device 312). Subsequently, at block 618, when the first client device 302 communicates with the second client device 306, and vice versa, those communications will traverse the router device(s) 304, the common router device 310 via the spliced sockets (e.g., sockets 508a and 508b), as well as the router device(s) 308, to reach the other client system.

At block 620, a socket splicing operation is performed at the proxy system to provide a data path between the first computing device and the second computing device when no router device has performed the socket splicing operation. In an embodiment, at block 620 a socket splicing engine (not illustrated) in the proxy system 400 may perform the socket splicing operation by coupling, "splicing", and/or otherwise associating the socket 410a (through which the first connection to the first computing device is provided) with the socket 410b (through which the second connection to the second computing device is provided). In an embodiment, the socket splicing by the proxy system 400 may be performed as per conventional proxy system socket splicing operations known in the art. As such, when no router devices are able to perform the socket splicing operation, the proxy system may perform conventional socket splicing operations to provide a data path between the first computing device and the second computing device. The method 600 will then proceed to block 622 where data is transmitted between the first computing device and the second computing device on the data path provided by the proxy system. In an embodiment, the first computing device and/or the second computing device may send data communication to the other computing device, and in response those data communications will travel (e.g., via the other router device) to the proxy system that has provided the spliced sockets, and the data communication will traverse that proxy system via those spliced sockets such that it reaches that other computing device. However, in other embodiments, the proxy system may handle the data communications without socket splicing.

Figure 7:
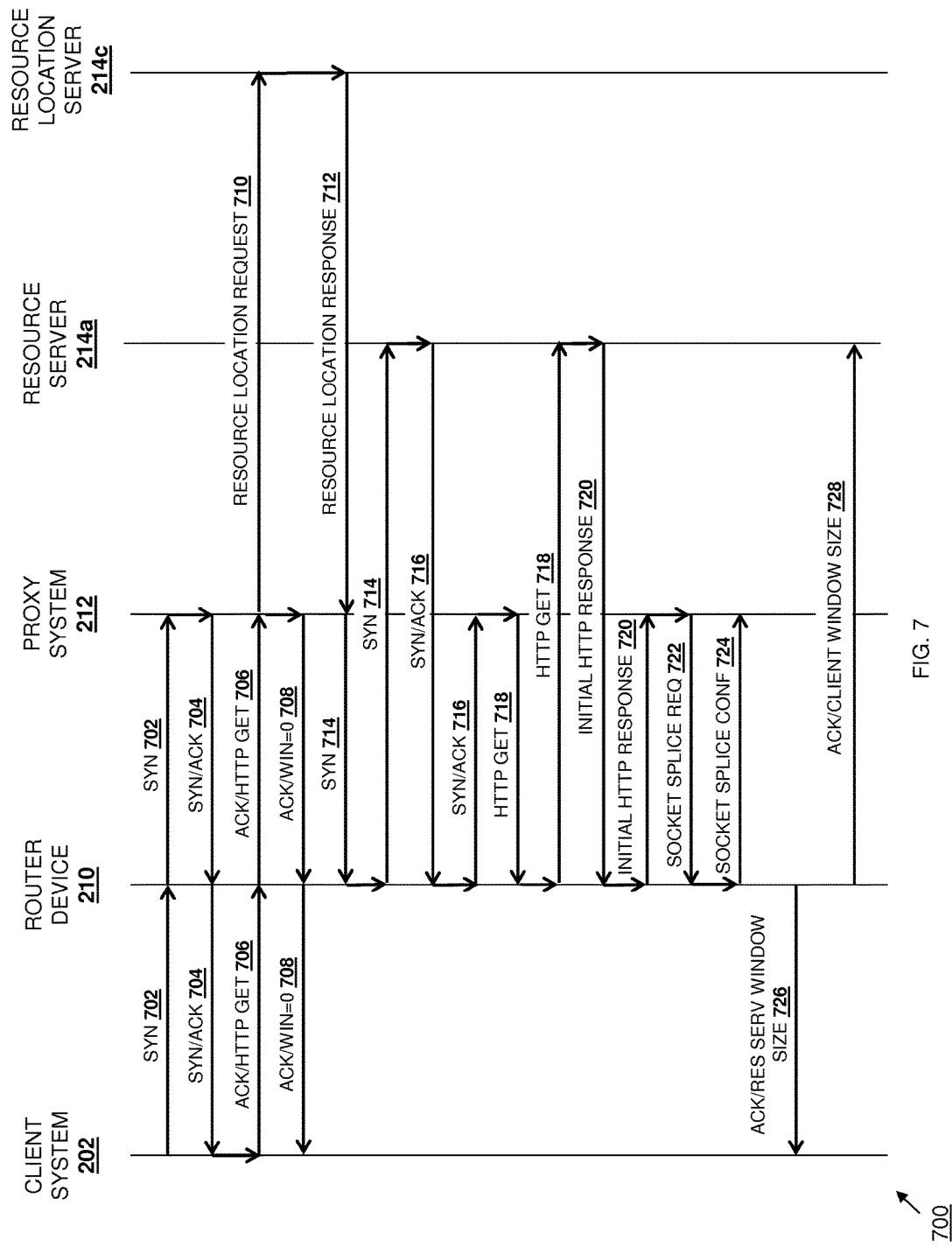
FIG. 7 is a flow diagram illustrating an embodiment the method of FIG. 6 being performed in the remote socket splicing system of FIG. 2.

Referring now to FIGS. 7, 8, 9, and 10, some specific embodiments of the remote socket splicing systems and methods are provided, each including specific communications that may be exchanged between elements in the system to provide the remote socket splicing functionality discussed above. While several of those specific embodiments of provided, they are not meant to be limiting, as a wide variety of different systems will benefits from the teachings of the present disclosure and the implementation of the teachings of the present disclosure in those system of the fall within its scope. Referring first to FIG. 7, a communication flow 700 performed in the remote socket splicing system 200 of FIG. 2 is illustrated. One of skill in the art in possession of the present disclosure will recognize that the communication flow 700 illustrates level 3, level 4, and level 7 mixed protocol layer elements. In that communication flow 700, the server 214c provides a resource location server 214c, the server 214a provides a resource server 214a, and the router device 210 performs the socket splicing operation. In a specific example, the communication flow 700 may illustrate a user computing system making a connection to a front-end HTTP server and requesting a large resource such as a video file.

The first connection is established (e.g., as per block 602 of the method 600) when the client system 202 sends a SYN packet 702 that is forwarded by the router device 210 to the proxy system 212. The proxy system 212 responds to the SYN packet 702 with a SYN/ACK packet 704 that is forwarded by the router device 210 to the client system 202. After receiving the SYN/ACK packet 704, the client system 202 sends an ACK/HTTP GET packet 706 that requests some resource provided by the resource server 214*a*, and the ACK/HTTP GET packet 706 is forwarded by the router device 210 to the proxy system 212. In response to receiving the ACK/HTTP GET packet 706, the proxy system 212 sends an ACK/WIN=0 packet 708 that is forwarded by the router device 210 to the client system 202. The ACK/WIN=0 packet 708 acknowledges the resource request (i.e., the HTTP GET) and sets a window size to zero in order to prevent further data transmissions from the client system 202 (while when using Hypertext Transfer Protocol (HTTP) is would unlikely be for the client system 202 to send further data, such is not the case for other protocols). The proxy system 212 then also internally disables acknowledgements to the client system 202 so that no further data received by the proxy system 212 from the client system 202 will be acknowledged.

The second connection is established (e.g., as per block 604 of the method 600) when, in response to receiving the ACK/HTTP GET packet 706, the proxy system 212 also discovers the resource server that the request from the client system 210 should be passed to by, for example, sending a resource location request 710 to the resource location server 214*c* that requests the location of the resource server 214*a* that can satisfy the request from the client system 202. The resource location server 214*c* responds to the proxy system 212 with a resource location response 712 that provides the identity of the resource server 214*a*. However, discovery of the resource server 214*a* may be accomplished by database lookup, broadcast, etc., and may result in the proxy system 212 receiving the identity of a storage area network (SAN) supporting HTTP (or other protocols), or other server with locally attached storage. In response to receiving the resource location response 712, the proxy system 212 makes a TCP connection to the resource server 214*a* by sending a SYN packet 714 that is forwarded by the router device 210 to the resource server 214*a*. In response to receiving the SYN packet 714, the resource server 214*a* responds with a SYN/ACK packet 716 that is forwarded by the router device 210 to the proxy system 212. Before making an HTTP (or other protocol) request from the resource server 214*a*, the proxy system 212 may internally disable acknowledgements to the resource server 214*a* so that no further data received by the proxy system 212 from the resource server 214*a* will be acknowledged, and set a relatively small window size so that the response can be previewed. The proxy system 212 then sends an HTTP GET 718 that is forwarded by the router device 210 to the resource server 214*a*. The resource server 214*a* responds to the HTTP GET 718 with an initial HTTP response 720 that is forwarded by the router device 210 to the proxy system 212 for preview. Prior to reviewing the initial HTTP response 720, the proxy system 212 may set the window size back to zero.

The remote socket splice operation (as per blocks 606, 608, 610, and 612 of the method 600) may be performed by the proxy system 212 in response to determining that the initial HTTP response 720 was successful. The proxy system 212 sends a socket splice request 722 to the router device 210 and, in response, the router device 210 may create NAT entries to splice the sockets in the router device 210 that are connected to the client system 202 and the resource server 214*a*. The router device 210 may then send a socket splice confirmation 724 to the proxy system 212, along with a reset on each socket. The reset on each socket ensures that the connection to the proxy system 212 is closed by causing the proxy system 212 to shut down the connections to the client system 202 and the resource server 214*a*, and informing intermediate routers that the proxy server 212 is no longer part of the communications between the client system 202 and the resource server 214*a*. The router device 210 also sends an ACK/resource server window size packet 726 to the client system 202 that is based on the last seen TCP sequence numbers and that resets the window size so that the window sized advertised by the resource server 214*a* is the one permitted by the client system 202. The router device 210 also sends an ACK/client server window size packet 728 to the client system 202 that is based on the last seen TCP sequence numbers and that resets the window size so that the window sized advertised by the client system 202 is the one permitted by the resource server 214*a*. The TCP sequence numbers and advertised window sizes may be tracked by the router device 210, included in the instruction to perform the socket splice operation, and/or in a variety of other manners known in the art. The client system 202 and the resource server 214*a* may then subsequently communicate via a data path that utilizes the spliced sockets in the router device 210 and that does not include the proxy system 212. In the event the router device 210 fails to perform the socket splicing operation, the router device 210 may send a failure messages to the proxy system 212. If the proxy system receives the failure message (or does not receive the socket splice confirmation 724), the proxy server 212 may enable acknowledgements, restore the window size, and perform socket splicing internally.

Figure 8:
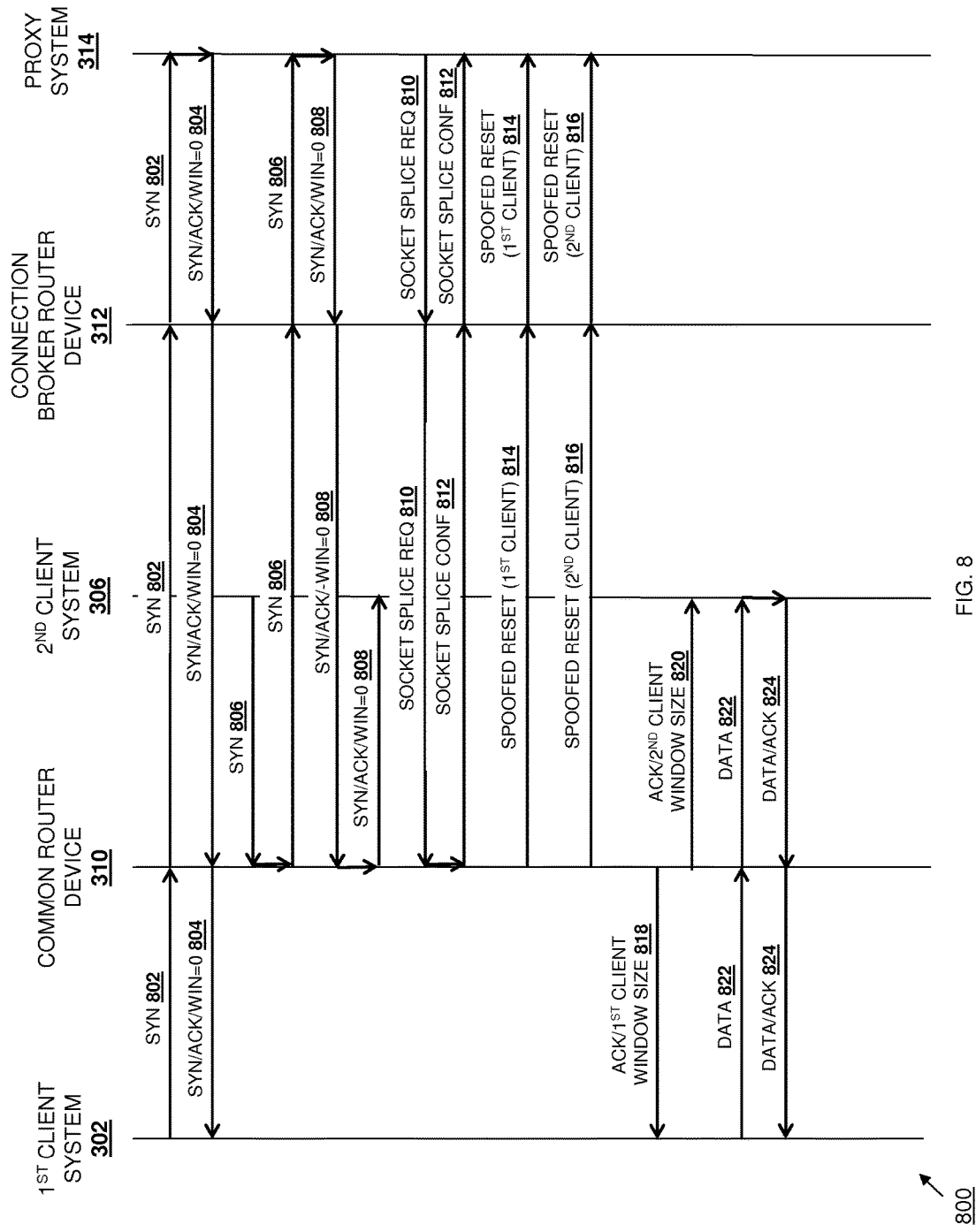
FIG. 8 is a flow diagram illustrating an embodiment the method of FIG. 6 being performed in the remote socket splicing system of FIG. 3.

Referring now to FIG. 8, a communication flow 800 performed in the remote socket splicing system 300 of FIG. 3 is illustrated. One of skill in the art in possession of the present disclosure will recognize that the communication flow 800 illustrates level 3, level 4, and level 7 mixed protocol layer elements. In that communication flow 800, proxy server 314 may be provided by a STUN server that requests remote socket splicing based on SYN packets received from the first client system 302 and the second client system 306 that may be located behind a NAT router (not normally the same NAT router). In a specific example, the communication flow 700 illustrates a user computing system making a connection to another user computing system to perform a file transfer, video conferencing, or other data intensive communications. While the connections illustrated in FIG. 8 are TCP connections, such connections may be performed using User Datagram Protocol (UDP) or other protocols known in the art (e.g., protocols subject to NAT).

The first connection is established (e.g., as per block 602 of the method 600) when the first client system 302 sends a SYN packet 802 that is forwarded by the common router device 310 and the connection broker router device 312 to the proxy system 314. The SYN packet 802 may request a connection to the proxy system 314 at a pre-negotiated port and address on the proxy system 314. The proxy system 314 responds to the SYN packet 802 with a SYN/ACK/WIN=0 packet 804 that is forwarded by the connection broker router device 312 and the common router device 310 to the first client system 302. The SYN/ACK/WIN=0 packet 804 sets a window size to zero in order to prevent further data transmissions from the first client system 302. The proxy system 314 then also internally disables acknowledgements so that no further data received by the proxy system 314 will be acknowledged.

The second connection is established (e.g., as per block 604 of the method 600) when the second client system 306 sends a SYN packet 806 that is forwarded by the common router device 310 and the connection broker router device 312 to the proxy system 314. The SYN packet 806 may request a connection to the proxy system 314 at a pre-negotiated port and address on the proxy system 314. The proxy system 314 responds to the SYN packet 806 with a SYN/ACK/WIN=0 packet 808 that is forwarded by the connection broker router device 312 and the common router device 310 to the second client system 306. The SYN/ACK/WIN=0 packet 808 sets a window size to zero in order to prevent further data transmissions from the second client system 306. The proxy system 314 then also internally disables acknowledgements to the second client system 306 so that no further data received by the proxy system 212 so that no further data received by the proxy system 314 from the second client system 306 will be acknowledged.

The remote socket splice operation (as per blocks 606, 608, 610, and 612 of the method 600) may be performed by the proxy system 314, which may detect that the connection broker router device 312 provides the connections to the first client system 302 and the second client system 206. The proxy system 212 sends a socket splice request 810 to the connection broker router device 312, and the connection broker router device 310 may then may detect that the common router device 310 provides the connections to the first client system 302 and the second client system 206 and, in response, forward the socket splice request 810 (e.g., as per blocks 606 and 608) to the common router device 310. The common router device 310 may then determine that a next-hop router device does not provide connections to both of the first client system 302 and the second client system 306, that the next-hop router device will not (or cannot) perform the socket splice operation, etc. The common router device 310 may then create/merge NAT entries with appropriate sequence numbers to splice the sockets in the common router device 310 that are connected to the first client system 302 and the second client system 306. In a specific example, the common router device 310 could be a common consumer NAT router shared by two client systems in the same building. The common router device 310 may then send a socket splice confirmation 812 that is forwarded by the connection broker router device 312 to the proxy system 314.

The common router device 310 may then spoof resets from each of the first client system 302 and the second client system 306 by sending spoofed resets 814 and 816 that are forwarded by the connection broker router device 312 to the proxy system 314. The spoofed resets 814 and 816 ensure that the connection to the proxy system 314 is closed by causing the proxy system 314 to shut down the connections to the first client system 302 and the second client system 306, and informing intermediate routers that the proxy server 314 is no longer part of the communications between the first client system 302 and the second client system 306. The common router device 310 also sends an ACK/first client window size packet 818 to the first client system 302 that is based on the last seen TCP sequence numbers and that resets the window size so that the window sized advertised by the second client system 306 is the one permitted by the first client system 302. The common router device 310 also sends an ACK/second client window size packet 820 to the second client system 306 that is based on the last seen TCP sequence numbers and that resets the window size so that the window sized advertised by the first client system 302 is the one permitted by the second client system 306. The TCP sequence numbers and advertised window sizes may be tracked by the router device 310, included in the instruction to perform the socket splice operation, and/or in a variety of other manners known in the art. The first client system 302 and the second client system 306 may then subsequently communicate via a data path that utilizes the spliced sockets in the router device 310 and that does not include the proxy system 314 (or the connection broker router device 312). In the event the common router device 310 fails to perform the socket splicing operation, the common router device 310 may send a failure messages to the connection broker router device 312, which may then attempt to perform the socket splicing operation. If the connection broker router device 312 fails to perform the socket splicing operation, the connection broker router device 312 may send a failure messages to the proxy system 314. If the proxy system receives the failure message (or does not receive the socket splice confirmation 812) and the sockets remain open, the proxy server 314 may enable acknowledgements, restore the window size, and perform socket splicing internally.

The transmission of data on the data path that does not include the proxy system 314 (as per block 618 of the method 600) may be performed by the first client system 302 sending a data packet 822 that is forwarded by the common router device 310 (via its spliced sockets) to the second client system 306, which responds with a data/ACK packet 824 that is forwarded by the common router device 310 (via its spliced sockets) to the first client system 302. Similarly the second client system 306 may send data packet that are forwarded by the common router device 310 (via its spliced sockets) to the first client system 302, which may response with data/ACK packets that are forwarded by the common router device 310 (via its spliced sockets) back to the second client system 306 in the same manner.

Figure 9:
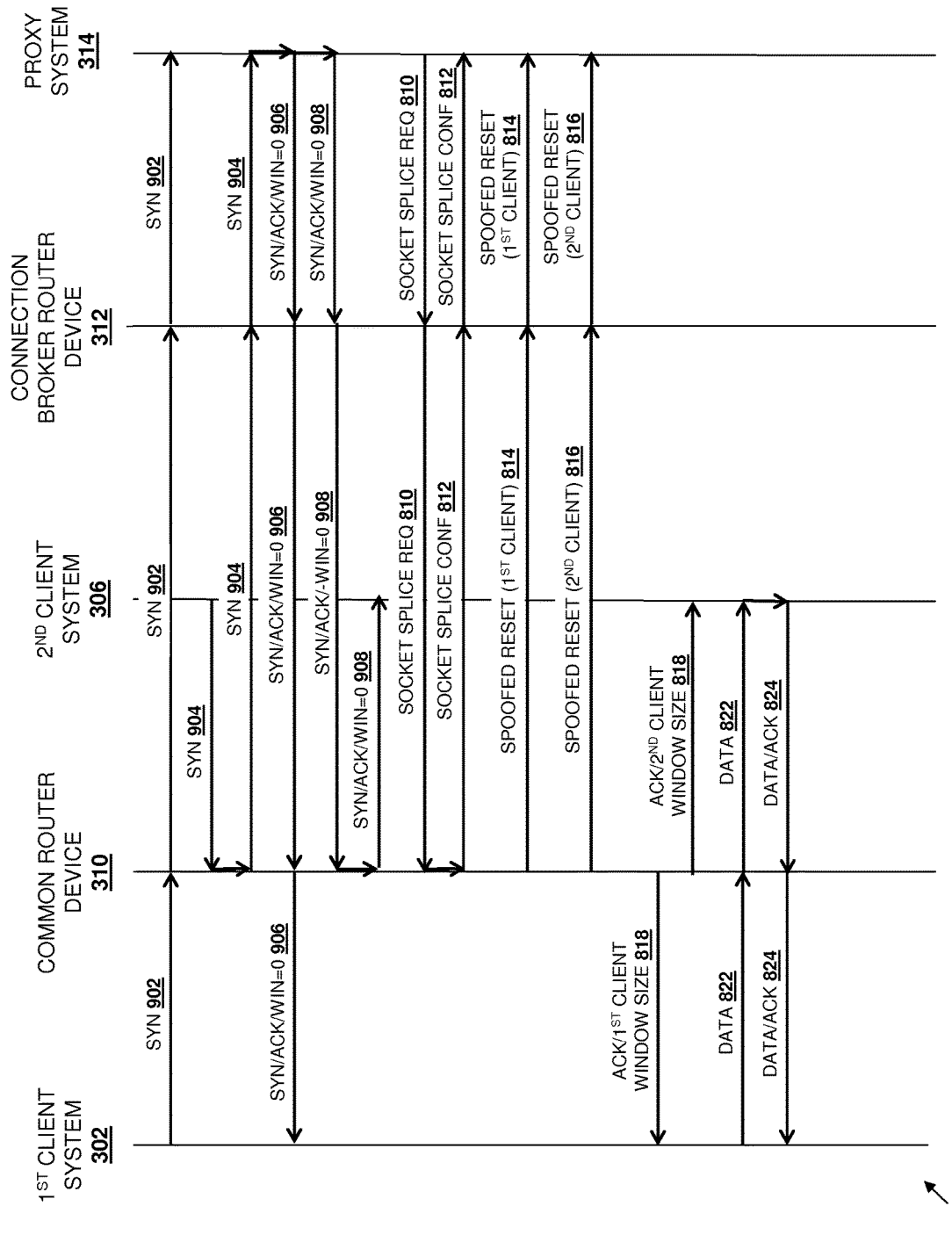
FIG. 9 is a flow diagram illustrating an embodiment the method of FIG. 6 being performed in the remote socket splicing system of FIG. 3.

Referring now to FIG. 9, a communication flow 900 performed in the remote socket splicing system 300 of FIG. 3 is illustrated. In that communication flow 900, proxy server 314 may be provided by a STUN server that requests remote socket splicing with kernel support. The communication flow 900 is substantially similar to the communication flow 800 described above with reference to FIG. 8, but with the exception that, rather than acknowledging SYN packets from client systems immediately and operating in the manner discussed above in response to receiving SYN packets, such acknowledgements and operations are performed after receiving SYN packets from both client systems.

The first connection and the second connection are established (e.g., as per blocks 602 and 604 of the method 600) when the first client system 302 sends a SYN packet 902 that is forwarded by the common router device 310 and the connection broker router device 312 to the proxy system 314, and the second client system 306 sends a SYN packet 904 that is forwarded by the common router device 310 and the connection broker router device 312 to the proxy system 314. The SYN packets 902 and 904 may request a connection to the proxy system 314 at a pre-negotiated port and address on the proxy system 314, and the proxy system 314 will not respond until a corresponding SYN packet (e.g., the SYN packet 904 corresponding to the SYN packet 902) is received. The proxy system 314 responds to the SYN packets 902 and 904 with a SYN/ACK/WIN=0 packets 906 that is forwarded by the connection broker router device 312 and the common router device 310 to the first client system 302, and a SYN/ACK/WIN=0 packets 908 that is forwarded by the connection broker router device 312 and the common router device 310 to the second client system 306. The SYN/ACK/WIN=0 packets 906 and 908 set a window size to zero in order to prevent further data transmissions from the first client system 302 and the second client system 908. The proxy system 314 then also internally disables acknowledgements so that no further data received by the proxy system 314 on the sockets connected to the first client system 302 and the second client system 908 will be acknowledged.

Figure 10:
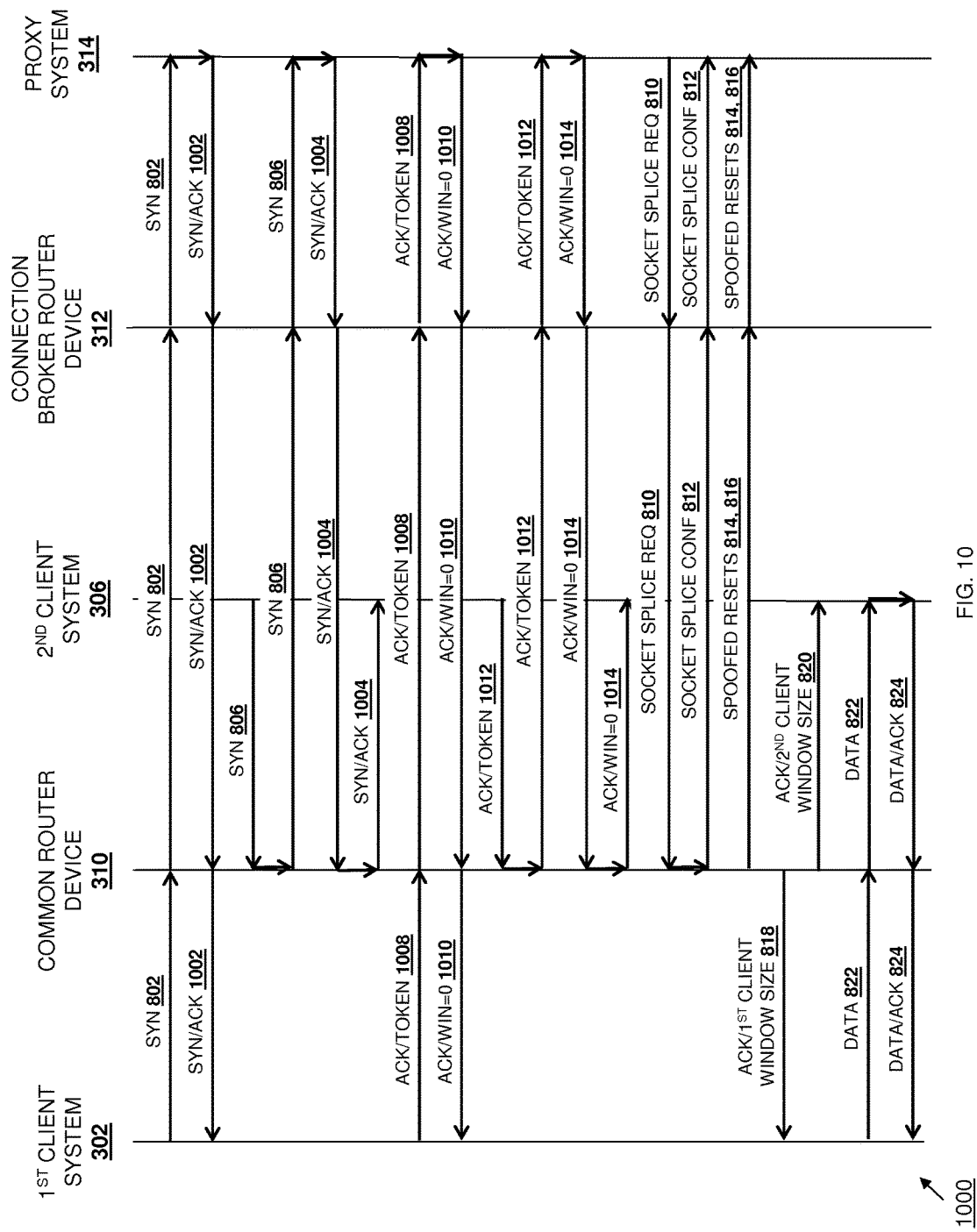
FIG. 10 is a flow diagram illustrating an embodiment the method of FIG. 6 being performed in the remote socket splicing system of FIG. 3.

Referring now to FIG. 10, a communication flow 1000 performed in the remote socket splicing system 300 of FIG. 3 is illustrated. In that communication flow 1000, proxy server 314 may be provided by a STUN server that requests remote socket splicing for two independent remote client systems. The communication flow 1000 is substantially similar to the communication flow 800 described above with reference to FIG. 8, but with the exception that tokens are utilized to ensure that the first client system 302 should be connected to the second client system 306. Following receiving the SYN packet 802 from the first client system 302, the proxy system 314 responds with a SYN/ACK packet 1002 that does not set the window size to zero as in the communication flow 800. Similarly, following receiving the SYN packet 806 from the second client system 306, the proxy system 314 responds with a SYN/ACK packet 1004 that does not set the window size to zero as in the communication flow 800. Following receiving the SYN/ACK packet 1002, the first client system 302 responds with an ACK/token packet 1008 that includes a token for communicating with the second client system 306, and that is forwarded by the common router device 310 and the connection broker router device 312 to the proxy system 314. The proxy system 314 responds to the ACK/token packet 1008 with an ACK/WIN=0 packet 1010 that sets the window size to zero as discussed above. Similarly, following receiving the SYN/ACK packet 1004, the second client system 306 responds with an ACK/token packet 1012 that includes a token that corresponds to the token sent by the first client system 302, and that is forwarded by the common router device 310 and the connection broker router device 312 to the proxy system 314. The proxy system 314 responds to the ACK/token packet 1012 with an ACK/WIN=0 packet 1014 that sets the window size to zero as discussed above.

Thus, systems and methods have been described that provide for the offloading of data communications between a plurality of computing devices from a proxy server to a router device that provides connections to each of the computing devices. The proxy server operates to establish the connections between the computing devices, and then sends an instructions to a router device to perform a socket splicing operation that will provide a data path between the computing devices that does not include the proxy server, which allows the proxy server to drop out of the subsequent data communication, and frees up proxy server resources while providing a more efficient communication path between the computing devices.

Specific applications of the teachings of the present disclosure may be provided with UDP connections and STUN servers such that two behind-NAT client systems that relay traffic via the STUN server on a different continent may have their connections spliced by routers on the same continent at the request of the STUN server. Furthermore, as is known in the art, the ease with which socket splicing may be performed can be effected by a mismatch between TCP features/options including, for example, selective acknowledgement, custom/unknown TCP options, maximum transmission units, maximum segment size in SYN packets, multipath TCP, and/or other features/options known in the art, and optimizations may be made with regard to these and/or other features/options to provide a more efficient system as per the teachings of the present disclosure. Other optimizations may include establishing the second connection to the second computing device in such a way as to be compatible with the first connection to the first computing device (e.g., using input/output control, copying active features from an existing socket, etc.), which may require special library or application support. In such systems, router devices may track such options and refuse to perform socket splicing if incompatibilities exists and the incompatibility cannot be remedied by the router device. Furthermore, a STUN server may notify router devices to watch out for two DST tuples for splicing (rather than two SRC/DST tuple pairs), as SRC cannot be part of the specification because it prevents the router device from being certain what NAT may occur in route that would affect the SRC tuple (and it would not be easy to propagate a notice beyond the edge router as the incoming route is not certain). Finally, when a client system requests encryption (e.g., HTTPS), an HTTPS terminator/concentrator may be used to terminate the HTTPS connection and propagate a standard HTTP connection.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A remote socket splicing system, comprising:
a first computing device;
a second computing device;
a first router device that includes a first chassis and a first communication system that is housed in the first chassis and that includes a first socket that is coupled to the first computing device and a second socket that is coupled to the second computing device; and
a proxy system that includes a second chassis and a second communication system that is housed in the second chassis and that is coupled to the first communication system of the first router device, wherein the proxy system is configured to:
operate on a first connection with the first computing device through the first router device;
operate on a second connection with the second computing device through the first router device; and
send an instruction to perform a socket splicing operation to the first router device subsequent to operating on the first connection and the second connection, wherein the first router device is configured to perform the socket splicing operation to provide a data path between the first computing device and the second computing device through the first socket and the second socket such that the data path does not include the proxy system.

2. The remote socket splicing system of claim 1, wherein first computing device is a client device and the second computing device is a server, and wherein the first router device is configured to use the data path to transmit at least one response from the server to the client device.

3. The remote socket splicing system of claim 1, wherein first computing device is a first client device and the second computing device is a second client device, and wherein the first router device is configured to use the data path to provide communications between the first client device and the second client device.

4. The remote socket splicing system of claim 1, further comprising:
a second router device that is coupled between the first router device and the proxy system, wherein the second router device is configured to receive the instruction to perform the socket splicing operation, determine that the first router device is coupled to both of the first computing device and the second computing device and, in response, forward the instruction to perform the socket splicing operation to the first router device.

5. The remote socket splicing system of claim 1, wherein the proxy system is configured to:
determine that the first router device routes each of the first connection and the second connection and, in response, send the instruction to perform the socket splicing operation to the first router device.

6. The remote socket splicing system of claim 1, wherein the first router device is configured to:
determine that the instruction to perform the socket splicing operation is associated with the first computing device and the second computing device;
identify a first connection entry for the first connection to the first computing device and a second connection entry for the second connection to the second computing device in a connection tracking database and, in response, perform the socket splicing operation; and
provide a spliced connection entry in the connection tracking database and remove the first connection entry and the second connection entry from the connection tracking database in response to performing the socket splicing operation.

7. An information handling system (IHS), comprising:
a first chassis;
a first communication system that is housed in the first chassis and that is configured to couple to a second communication system that is housed in a second chassis of a first router device;
a processing system that is housed in the first chassis and coupled to the first communication system; and
a memory system that is housed in the first chassis and that is coupled to the processing system and that includes instruction that, when executed by the processing system, cause the processing system to provide a remote socket splicing engine that is configured to:
operate on a first connection through the second communication system included in the first router device and to a first computing device using the first communication system;
operate on a second connection through the second communication system included in the first router device and to a second computing device using the first communication system; and
send, to the first router device using the first communication system, an instruction to perform a socket splicing operation on the second communication system subsequent to operating on the first connection and the second connection, wherein the instruction to perform the socket splicing operation is configured to cause the second communication system included in the first router device to provide a first data path between the first computing device and the second computing device that does not include the first communication system.

8. The IHS of claim 7, wherein first computing device is a client device and the second computing device is a server, and wherein the instruction to perform the socket splicing operation is configured to cause the first router device to use the first data path to transmit at least one response from the server to the client device.

9. The IHS of claim 7, wherein first computing device is a first client device and the second computing device is a second client device, and wherein the instruction to perform the socket splicing operation is configured to cause the first router device to use the first data path to provide communications between the first client device and the second client device.

10. The IHS of claim 7, wherein the first communication system is configured to couple to the second communication system included in the first router device through a third communication system that is housed in a third chassis of a second router device, and wherein the instruction to perform the socket splicing operation is configured to cause the second router device to determine that the first router device is coupled to both of the first computing device and the second computing device and, in response, forward the instruction to perform the socket splicing operation to the first router device.

11. The IHS of claim 7, wherein the remote socket splicing engine is configured to:
determine that the first router device routes each of the first connection and the second connection and, in response, send the instruction to perform the socket splicing operation to the first router device.

12. The IHS of claim 7, wherein the remote socket splicing engine is configured to:
receive a response from the first router device indicating that the socket splicing operation was not performed by the first router device and, in response, perform the socket splicing operation to provide a second data path between the first computing device and the second computing device that includes the first communication system.

13. The IHS of claim 7, wherein the instruction to perform the socket splicing operation identifies the first connection using at least a first connection source port, a first connection source address, a first connection destination port, and a first connection destination address, and wherein the instruction to perform the socket splicing operation identifies the second connection using at least a second connection source port, a second connection source address, a second connection destination port, and a second connection destination address.

14. A method for performing remote socket slicing, comprising:
operating, by a proxy system that includes a first chassis and a first communication system that is housed in the first chassis, on a first connection with a first computing device through a second communication system that is housed in a second chassis of a first router device, wherein the second communication system is coupled to the first communication system;
operating, by the proxy system, on a second connection with a second computing device through the first communication system and the second communication included in the first router device; and sending, by the proxy system to the first router device using the first communication system, an instruction to perform a socket splicing operation on the second communication system subsequent to operating the first connection and the second connection, wherein the instruction to perform the socket splicing operation is configured to cause the second communication system included in the first router device to provide a first data path between the first computing device and the second computing device that does not include the first communication system included in the proxy system.

15. The method of claim 14, wherein first computing device is a client device and the second computing device is a server, and wherein the instruction to perform the socket splicing operation is configured to cause the first router device to use the first data path to transmit at least one response from the server to the client device.

16. The method of claim 14, wherein first computing device is a first client device and the second computing device is a second client device, and wherein the instruction to perform the socket splicing operation is configured to cause the first router device to use the first data path to provide communications between the first client device and the second client device.

17. The method of claim 14, further comprising:
receiving, by a second router device that includes a third chassis and a third communication system that is housed in the chassis, wherein the third communication system is coupled between the first communication system included in the proxy system and the second communication system included in the first router device, the instruction to perform the socket splicing operation; and
determining, by the second router device, that the second communication system included in the first router device is coupled to both of the first computing device and the second computing device and, in response, forwarding the instruction to perform the socket splicing operation on the second communication system to the first router device.

18. The method of claim 14, further comprising:
determining, by the proxy system, that the first router device routes each of the first connection and the second connection and, in response, sending the instruction to perform the socket splicing operation on the second communication system to the first router device.

19. The method of claim 14, further comprising:
determining, by the first router device, that the instruction to perform the socket splicing operation is associated with the first computing device and the second computing device;
identifying, by the first router device, a first connection entry for the first connection to the first computing device and a second connection entry for the second connection to the second computing device in a connection tracking database and, in response, performing the socket splicing operation on the second communication system; and
providing, by the first router device, a spliced connection entry in the connection tracking database and removing the first connection entry and the second connection entry from the connection tracking database in response to performing the socket splicing operation on the second communication system.

20. The method of claim 14, further comprising:
receiving, by the proxy system from the second communication system included in the first router device, a response indicating that the socket splicing operation was not performed by the first router device and, in response, performing the socket splicing operation on the first communication system to provide a second data path between the first computing device and the second computing device that includes the proxy system.

* * * * *